United States Patent
Fish et al.

(10) Patent No.: US 9,430,598 B2
(45) Date of Patent: Aug. 30, 2016

(54) DUAL MODE LOGIC CIRCUITS

(71) Applicant: B.G. Negev Technologies & Applications Ltd., Beer-Sheva (IL)

(72) Inventors: Alexander Fish, Tel-Mond (IL); Asaf Kaizerman, Givataim (IL); Itamar Levy, LeHavim (IL); Sagi Fisher, Tel-Aviv (IL)

(73) Assignee: Bar-Ilan University, Ramat-Gan (IL)

( * ) Notice: Subject to any disclaimer, the term of this patent is extended or adjusted under 35 U.S.C. 154(b) by 0 days.

(21) Appl. No.: 14/377,893

(22) PCT Filed: Feb. 6, 2013

(86) PCT No.: PCT/IL2013/050111
§ 371 (c)(1),
(2) Date: Aug. 11, 2014

(87) PCT Pub. No.: WO2013/118119
PCT Pub. Date: Aug. 15, 2013

(65) Prior Publication Data
US 2015/0339420 A1    Nov. 26, 2015

Related U.S. Application Data

(63) Continuation-in-part of application No. PCT/IB2012/053972, filed on Aug. 2, 2012.

(60) Provisional application No. 61/596,748, filed on Feb. 9, 2012, provisional application No. 61/514,497, filed on Aug. 3, 2011.

(51) Int. Cl.
*G06F 17/50* (2006.01)

(52) U.S. Cl.
CPC .......... *G06F 17/5045* (2013.01); *G06F 17/50* (2013.01); *G06F 17/505* (2013.01); *G06F 2217/02* (2013.01)

(58) Field of Classification Search
CPC .................... G06F 17/505; G06F 17/175031; G06F 17/5045; G06F 2217/84
USPC .................................................. 716/100–108
See application file for complete search history.

(56) References Cited

U.S. PATENT DOCUMENTS

| 4,924,430 A | 5/1990 | Zasio et al. |
| 6,744,282 B1 | 6/2004 | Dhong et al. |

(Continued)

FOREIGN PATENT DOCUMENTS

| WO | WO 2013/018061 | 2/2013 |
| WO | WO 2013/118119 | 8/2013 |

OTHER PUBLICATIONS

International Preliminary Report on Patentability Dated Feb. 13, 2014 From the International Bureau of WIPO Re. Application No. PCT/IB2012/053972.

(Continued)

*Primary Examiner* — Paul Dinh

(57) ABSTRACT

A method for designing a dual-mode logic circuit which is selectably operational in static and dynamic modes is performed as follows. A basis library with a DML inverter and dual-mode logic (DML) bicells is provided. Each DML bicell includes a type-A DML logic gate with a clock input and a type-B DML logic gate with an inverted clock input. A pseudo-static library is formed from the basis library by modifying each bicell of the basis library and specifying at least one dynamic timing parameter. A dynamic library is formed from the basis library by specifying dynamic timing parameters for the basis library DML inverter and bicells. Logic behavior of the required logic circuit is defined. An initial logic circuit design synthesized from the pseudo-static library and the defined logic behavior. Finally, a dynamic circuit design is formed by replacing modified bicells with corresponding bicells from the dynamic library.

20 Claims, 23 Drawing Sheets

(56) References Cited

U.S. PATENT DOCUMENTS

| | | | |
|---|---|---|---|
| 8,095,899 B1 * | 1/2012 | Dupenloup | G06F 7/53 716/100 |
| 2003/0046649 A1 | 3/2003 | Wheeler et al. | |
| 2003/0153156 A1 | 8/2003 | Forbes | |
| 2005/0052203 A1 | 3/2005 | Ngo | |
| 2006/0001451 A1 | 1/2006 | Malik | |
| 2006/0044020 A1 | 3/2006 | Aipperspach et al. | |
| 2006/0139061 A1 | 6/2006 | Curtis et al. | |
| 2006/0164119 A1 | 7/2006 | Nowak-Leijten | |
| 2007/0262793 A1 | 11/2007 | Kapoor | |
| 2009/0109780 A1 | 4/2009 | Chang et al. | |
| 2009/0271747 A1 | 10/2009 | Tanaka | |
| 2010/0127745 A1 | 5/2010 | Hwang et al. | |
| 2010/0231263 A1 | 9/2010 | Fish et al. | |
| 2010/0301903 A1 | 12/2010 | Cocchi et al. | |
| 2014/0232432 A1 | 8/2014 | Fish et al. | |

OTHER PUBLICATIONS

International Preliminary Report on Patentability Dated Aug. 21, 2014 From the International Bureau of WIPO Re. Application No. PCT/IL2013/050111.

International Search Report and the Written Opinion Dated Jun. 10, 2013 From the International Searching Authority Re. Application No. PCT/IL2013/050111.

International Search Report and the Written Opinion Dated Dec. 17, 2012 From the International Searching Authority Re. Application No. PCT/IB2012/053972.

Notice of Allowance Dated Jun. 24, 2014 From the US Patent and Trademark Office Re. U.S. Appl. No. 14/236,641.

Alioto "Understanding DC Behvior of Subthreshold CMOS Logic Through Closed-Form Analysis", IEEE Transactions on Circuits and Systems, I: Regular Papers, 57(7): 1597-1607, Jul. 2010.

Bol et al. "Analysis and Minimization of Practical Energy in 45nm Subthreshold Logic Circuits", IEEE International Conference on Computer Design, ICCD 2008, Lake Tahoe, CA, USA, Oct. 12-15, 2008, p. 294-300, Oct. 2008.

Calhoun et al. "Modeling and Sizing for Minimum Energy Operation in Subthreshold Circuits", IEEE Journal of Solid-State Circuits, 40(9): 1778-1786, Sep. 2005.

Calhoun et al. "Sub-Threshold Operation and Cross-Hierarchy Design for Ultra Low Power Wearable Sensors", IEEE International Symposium in Circuits and Systems, ISCAS 2009, p. 1437-1440, 2009.

Calhoun et al. "Ultra-Dynamic Voltage Scaling (UDVS) Using Sub-Threshold Operation and Local Voltage Dithering", IEEE Journal of Sold-State Circuits, 41(1): 238-245, Jan. 2006.

Chandrakasan et al. "Low-Power CMOS Digital Design", IEEE Journal of Solid-State Circuits, 27(4): 473-484, Apr. 1992.

Chang et al. "A Review of 0.18-[Mu]m Full Adder Performances for Tree Structured Arithmetic Circuits", IEEE Transactions on Very Large Scale Integration (VLSI) Systems, 13(6): 686-695, Jun. 2005.

Chappell et al. "A System-Level Solution to Domino Synthesis With 2 GHz Application", Proceedings of the 2002 IEEE International Conference on Computer Design: VLSI in Computer Processors, ICCD '02, Freiburg, Germany, Sep. 16-18, 2002, p. 164-171, 2002.

Chen et al. "Triple-Threshold Static Power Minimization Technique in High-Level Synthesis for Designing High-Speed Low-Power SOC Applications Using 90nm MTCMOS Technology", Canadian Conference on Electrical and Computer Engineering 2007, CCECE 2007, Cancouver, BC, Canada, Apr. 22-26, 2007, p. 1671-1674, Apr. 2007.

Cheng et al. "Self-Timed Carry-Lookahead Adders", IEEE Tansactions on Computer, 49(7): 659-672, Jul. 2000.

De Gloria et al. "Statistical Carry Lookahead Adders", IEEE Transactions on Computers, 45(3): 340-347, Mar. 1996.

Elgebaly et al. "Efficient Adaptive Voltage Scaling System Through On-Chip Critical Path Emulation", Proceedings of the 2004 International Symposium on Low Power Electronics and Design, ISLPED'04, Newport Beach, CA, USA, Aug. 9-11, 2004, 14.1: 375-380, Aug. 2004.

Gammle et al. "A 45nm 3.5G Baseband-and-Multimedia Application Processor Using Adaptive Body-Bias and Ultra-Low-Power Techniques", 2008 IEEE International Solid-State Circuits Conference, ISSCC 2008, Digest of Technical Paper, Mobile Processing, Session 13, 13.2: 258-259, 611, Feb. 5, 2008.

Goncalves et al. "NORA: A Racefree Dynamic CMOS Technique for Pipelined Logic Structures", IEEE Journal of Solid-State Circuits, SC-18(3): 261-266, Jun. 1983.

Guyot et al. "A Way to Build Efficient Carry-Skip Adders", IEEE Transactions on Computers, C-36(10): 1144-1152, Oct. 1987.

Hanson et al. "Ultralow-Voltage, Minimum-Energy CMOS", IBM Journal of Research & Development, 50(4/5): 469-490, Jul./Sep. 2006.

Harris et al. "A Transregional Model for Near-Threshold Circuits With Application to Minimum-Energy Operation", 22nd International Conference on Microelectronics (ICM 2010), p. 64-67, Dec. 2010.

Harris et al. "Skew-Tolerant Domino Circuits", IEEE Journal of Solid-State Circuits, 32(11): 1702-1711, Nov. 1997.

Hossain "High Performance ASIC Design. Using Synthesizable Domino Logic in an ASIC Flow", Cambridge University Press, 2008.

Hwang et al. "ABRM: Adaptice Beta-Ration Modulation for Process-Tolerant Ultradynamic Voltage Scaling", IEEE Transactions on Very Large Scale Integration (VLSI) Systems, 18(2): 281-290, Feb. 2010.

Kao et al. "Subthreshold Leakage Modeling and Reduction Techniques", Proceedings of the 2002 IEEE/ACM International Conference on Computer-Aided Design, p. 141-148, 2002.

Keane et al. "Subthreshold Logical Effort: A Systematic Framework for Optimal Subthreshold Device Sizing", 43ed ACM/IEEE Design Automation Conference, DAC 2006, San Francisco, CA, USA, Jul. 24-28, 2006 p. 425-428, Jul. 2006.

Kwong et al. Variation-Driven Device Sizing for Minimum Energy Sub-Threshold Circuits, Proceedings of the 2006 International Symposium on Low Power Electronics and Design, ISLPED '06, Tegernsee, Germany, Oct. 4-6, 2006, p. 8-13, Oct. 2006.

Lehman et al. "Skip Techniques for High-Speed Carry-Propagation in Binary Arithmetic Units", IRE Transactions on Electronic Computers, p. 691-698, Dec. 1961.

Liu et al. "Performance of Submicron CMOS Devices and Gates With Substrate Biasing", IEEE International Symposium on Circuits and Systems, ISCAS 2000, Geneva, Switzerland, May 28-31, 2000, p. IV-9-IV-12, 2000.

Mair et al. "A 65-nm Mobile Multimedia Applicaitons Processor With an Adaptive Power Management Scheme to Compensate for Variations", 2007 Symposium on VLSI Circuits Digest of Technical Papers, p. 224-225, 2007.

Majerski "On Determination of Optimal Distributions of Carry Skips in Adders", IEEE Transactions on Electronic Computers, EC-16(1): 45-58, Feb. 1967.

Markovic et al. "Ultralow-Power Design in Near-Threshold Region. New Basic Logic That Selects Between Possible Output Values Using a Sense Amplifier May Be Able to Dramatically Improve Ultralow-Power System Performance", Proceedings of the IEEE, 98(2): 237-252, Feb. 2010.

Meijer et al. "Body-Bias-Driven Design Strategy for Area- and Performance-Efficient CMOS Circuits", IEEE Transactions on Very Large Scale Integration (VLSI) Systems, 20(1): 42-51, Jan. 2012.

Noullet et al. "Do We Need so Many Cells for Digital Asic Synthesis", Electron Technology, 32(3): 272-276, 1999.

Oklobdzija et al. "Some Optimal Schemes for Alu Implementation in VLSI Technology", 1985 IEEE 7th Symposium on Computer Arithmetic, ARITH, Urbana, Ill., USA, Jun. 4-6, 1985, p. 2-8, 1985.

Puri et al. "Logic Optimization by Output Phase Assignment in Dynamic Logic Synthesis", Proceedings of the 1996 IEEE/ACM International Conference on Computer-Aided Design, ICCAD '96, p. 2-7, 1997.

(56) References Cited

OTHER PUBLICATIONS

Scott et al. "Improving Cell Libraries for Synthesis", Proceedings of the IEEE 1994 Custom Integrated Circuits Conference, May 1-4, 1994, 7.2.1: 128-131, 1994.

Seevinck et al. "Static-Noise Margin Analysis of MOS SRAM Cells", IEEE Journal of Solid-State Circuits, SC-22(5): 748-754, Oct. 1987.

Sirisantana et al. "High-Performance Low-Power CMOS Circuits Using Multiple Channel Length and Multiple Oxide Thickness", Proceedings of the 2000 International Conference on Computer Design, Austin, TX, USA, Sep. 17-20, 2000, p. 227-232, 2000.

Soeleman et al. "Sub-Domino Logic: Ultra-Low Power Dynamic Sub-Threshold Digital Logic", Proceedings of the 14th International Conference on VLSI Design, VLSID '01, p. 211, 2001.

Soeleman et al. "Ultra-Low Power Digital Subthreshold Logic Circuits", Proceddings of the 1999 International Symposium on Low Power Electronics and Design, ISLPED99, San Diego, CA, USA, p. 94-96, 1999.

Strollo et al. "New Clock-Gating Techniques for Low-Power Flip-Flops", Proceedings of the 2002 International Symposium on Low Power Electronics and Design, ISLPED '00, p. 114-119, 2000.

Sutherland et al. "Logical Effort: Designing Fast CMOS Circuits", Draft, Morgan Kaufmann Publishers, Inc., 223 P., May 19, 1998.

Swanson et al. "Ion-Implanted Complementary MOS Transistors in Low-Voltage Circuits", IEEE International Solid-State Circuits Conference, ISSCC '72, University Museum, University of Pennsylvenia, USA, Feb. 18, 1972, Session XVI: New Device and Circuit Techniques, Digest of Technical Papers, FAM 16.5: 192-193, Feb. 18, 1972.

Tran et al. "Design of an Energy-Efficient 32-Bit Adder Operating at Subthreshold Voltages in 45-nm CMOS", Third International Conference on Communications and Electronics, ICCE 2010, Nha Trang, Vietnam, Aug. 11-13, 2010, p. 87-91, 2010.

Verma et al. "Nanometer MOSFET Variation in Minimum Energy Subthreshold Circuits", IEEE Transactions on Electron Devices, 55(1): 163-174, Jan. 2008.

Vittoz et al. "CMOS Analog Integrated Circuits Based on Weak Inversion Operation", IEEE Journal of Solid-State Circuits, SC-12(3): 224-231, Jun. 1977.

Zhai et al. "Analysis and Mitigation of Variability in Subthreshold Design", Proceedings of the 2005 International Symposium on Low Power Electronics and Design, ISPLED '05, San Diego, CA, USA, Aug. 8-10, 2005, p. 20-25, 2005.

\* cited by examiner

*Bicell* with footed A gate  Unfooted *bicell*  *Type_B* headed inverter

FIGURE 8

|   | Boolean expression | Drive strengths | Type-A | Type-B |
|---|---|---|---|---|
| 1 | A+B | 1×,2× | NOT | NAND2 |
|   |   |   | NOT |   |
| 2 | AB | 1×,2× | NAND2 | NOT |
| 3 | A+B+C+D | 1×,2× | NOR2 | NAND2 |
|   |   |   | NOR2 |   |
| 4 | (A+B)(C+D) | 1×,2× | NOR2 | NOR2 |
|   |   |   | NOR2 |   |
| 5 | (A+B)(C+D+E) | 1× | NOR2 | NOR2 |
|   |   |   | NOR3 |   |
| 6 | A+B+C | 1×,2× | NOR2 | NAND2 |
|   |   |   | NOT |   |
| 7 | AB+CD | 1×,2× | AOI221 | NOT |
| 8 | AB+CD+E | 1× | AOI221 | NAND2 |
|   |   |   | NOT |   |
| 9 | AB+CD+E+F | 1× | AOI221 | NAND2 |
|   |   |   | NOR2 |   |
| 10 | AB+CD+EF | 1× | AOI221 | NAND2 |
|   |   |   | NAND2 |   |
| 11 | (A+B)(C+D) | 1× | OAI221 | NOT |

FIGURE 15A

|  | Boolean expression | Drive strengths | Type-A | Type-B |
|---|---|---|---|---|
| 12 | (A+B)(C+D)+E | 1× | OAI221 | NAND2 |
|  |  |  | NOT |  |
| 13 | (A+B)(C+D)+E+F | 1× | OAI221 | NAND2 |
|  |  |  | NOR2 |  |
| 14 | (A+B)(C+D)+EF | 1× | OAI221 | NAND2 |
|  |  |  | NAND2 |  |
| 15 | Non-inverting buffer | 1×, 2×, 3×, 4× | NOT | NOT |
| 16 | A+B+C+D+E | 1× | NOR3 | NAND2 |
|  |  |  | NOR2 |  |
| 17 | A+B+C+D+E+F | 1× | NOR3 | NAND2 |
|  |  |  | NOR3 |  |
| 18 | A⊕B | 1×,2× | INV | OAI |
|  |  |  | INV |  |
| 19 | MUX2to1 | 1×,2× | AOI | NOT |
| 20 | DEC1to2_EN | 1× | NOT | NOR |
| 21 | H.A | 1×,2× | (*) | |
| 22 | F.A | 1×,2× | (*) | |

FIGURE 15B

DUAL MODE LOGIC CIRCUITS

RELATED APPLICATIONS

This application is a National Phase of PCT Patent Application No. PCT/IL2013/050111 having International filing date of Feb. 6, 2013, which claims the benefit of priority under 35 USC §119(e) of U.S. Provisional Patent Application No. 61/596,748 filed on Feb. 9, 2012, and which is also a continuation-in-part (CIP) of PCT Patent Application No. PCT/IB2012/053972 filed on Aug. 2, 2012.

PCT Patent Application No. PCT/IB2012/053972 claims the benefit of priority under 35 USC §119(e) of U.S. Provisional Patent Application Nos. 61/596,748 filed on Feb. 9, 2012 and 61/514,497 filed on Aug. 3, 2011.

The contents of the above applications are all incorporated by reference as if fully set forth herein in their entirety.

FIELD AND BACKGROUND OF THE INVENTION

The present invention, in some embodiments thereof, relates to a method of designing dual-mode logic circuits and, more particularly, but not exclusively, to a method of designing dual-mode logic circuits using electronic design automation tools.

Circuit design is a complex process which takes into account not only the desired logic functionality, but other factors such as physical behavior (e.g. sizing, capacitance . . . ), timing issues (e.g. desired operating frequency, propagation delays, and rise/fall times) and various other parameters. Electronic design automation (EDA) systems are software tools to assist in the design of electronic systems such as integrated circuits. The tools work together in a design flow that chip designers use to design and analyze entire semiconductor chips.

The most advanced EDA tools utilize a standard design flow (SDF) designed for CMOS logic gates. The SDF typically perform the logic circuit design in the following steps:

1) A formal description of the required logic behavior is provided in a hardware description language (HDL).
2) Logic synthesis to translate the HDL description into a discrete netlist of logic-gates and synchronous cells (such as registers\Flip-Flops etc.). Typically the synthesizers work with a library of static logic (asynchronous) blocks and dynamic logic (synchronous) blocks. For the static blocks the library includes various parameters (such as timing, capacitance, leakage currents, etc. . . . ). For the dynamic blocks the library includes some similar parameters (such as capacitance, leakage currents and more . . . ) and some different parameters (such as setup and hold timing parameters). Typically the logic-gates are static and the dynamic cells have no logic and only exist for synchronization purposes.
3) Placement and routing, based on the netlist and other parameters such as gate sizing.

CMOS designated EDA tools (e.g. Synopsis, Cadence . . . ) have been developed over many years and are extremely sophisticated. However these systems are suboptimal for other types of logic families, such as Domino logic gates. Designing an EDA for special logic families is impractical due to the complexity of the design process and would be very costly. It is therefore desirable to adapt the design process for special logic families (e.g. Domino logic) to the standard tools available for CMOS circuit design.

Another consideration in circuit design (custom design or automated tools design) is the critical path. The performance of most digital circuits and systems is determined by the delay of critical paths (CP). Even though standard synthesis tools attempt to design logic blocks without CP (i.e. equalized path delay), the slack from the targeted clock frequency always exists and should be repaired by designers. Many methods to meet these slacks have been proposed. These methods include adaptive voltage scaling with a CP emulator circuit, multi oxide thickness driven threshold-voltages, multi-channel lengths for energy reduction in the non-CPs and performance boost in the CPs. Another proposed solution is to apply a body bias on a non-CP to improve energy consumption and increase performance of the CPs. While the aforementioned methods alleviate the critical path slack problem, in most cases they also result in a significant increase of energy consumption.

Additional background art includes:

[1] R. Puri, A. Bjorksten and T. E. Rosser, "Logic optimization by output phase assignment in dynamic logic synthesis," in Proceedings of the 1996 IEEE/ACM international conference on Computer-aided design, pp. 2-7, 1997.

[2] R. Hossain, High performance ASIC design, Cambridge University Press, 2008.

[3] B. Chappell, X. Wang, P. Patra, P. Saxena, J. Vendrell, S. Gupta, S. Varadaraj an, W. Gomes, S. Hussain and H. Krishnamurthy, "A system-level solution to domino synthesis with 2 GHz application," in Computer Design: VLSI in Computers and Processors, 2002. Proceedings 2002 IEEE International Conference on, pp. 164-171, 2002.

[4] J. M. Rabaey, A. P. Chandrakasan and B. Nikolic, Digital integrated circuits, Prentice-Hall, 1996.

[5] N. F. Goncalves and H. De Man, "NORA: A racefree dynamic CMOS technique for pipelined logic structures," Solid-State Circuits, IEEE Journal Of, vol. 18, pp. 261-266, 1983.

[6] A. Strollo, E. Napoli and D. De Caro, "New clock-gating techniques for low-power flip-flops," in Proceedings of the 2000 international symposium on Low power electronics and design, pp. 114-119, 2000.

[7] T. Christiansen and R. L. Schwartz, Learning Perl, O'Reilly and Associates, 1997.

[8] I. E. Sutherland, R. F. Sproull and D. F. Harris, Logical effort: designing fast CMOS circuits, Morgan Kaufmann, 1999.

[9] D. Harris and M. A. Horowitz, "Skew-tolerant domino circuits," Solid-State Circuits, IEEE Journal Of, vol. 32, pp. 1702-1711, 1997.

[10] K. Keutzer, K. Kolwicz and M. Lega, "Impact of library size on the quality of automated synthesis," in Proc. of ICCAD, pp. 120-123, 1987.

[11] K. Scott and K. Keutzer, "Improving cell libraries for synthesis," in Custom Integrated Circuits Conference, 1994, Proceedings of the IEEE 1994, pp. 128-131, 1994.

[12] J. Noullet and A. Ferreira-Noullet, "Do We Need So Many Cells for Digital ASIC Synthesis?" ELECTRON TECHNOLOGY-WARSAW-, vol. 32, pp. 272-276, 1999.

[13] Y. Kukimoto, M. Berkelaar and K. Sakallah, "Static timing analysis," Logic Synthesis and Verification, pp. 373-401, 2002.

[14] T. Sasao, Switching theory for logic synthesis, Kluwer Academic Publishers, 1999.

[15] J. J. Zasio, K. C. Choy and D. R. Parham, Static Timing Analysis of Semiconductor Digital Circuits, 1990.

[16] M. Elgebaly and M. Sachdev, "Efficient Adaptive Voltage Scaling System Through On-Chip Critical Path Emulation," in Low Power Electronics and Design, 2004. ISLPED '04. Proceedings of the 2004 International Symposium on, pp. 375-380, 2004.

[17] H. L. A. Chen, E. K. W. Loo, J. B. Kuo and M. J. Syrzycki, "Triple-Threshold Static Power Minimization Technique in High-Level Synthesis for Designing High-Speed Low-Power SOC Applications Using 90 nm MTCMOS Technology," in Electrical and Computer Engineering, 2007. CCECE 2007. Canadian Conference on, pp. 1671-1674, 2007.

[18] N. Sirisantana, L. Wei and K. Roy, "High-performance low-power CMOS circuits using multiple channel length and multiple oxide thickness," in Computer Design, 2000. Proceedings. 2000 International Conference on, pp. 227-232, 2000.

[19] M. Meijer and J. P. de Gyvez, "Body-Bias-Driven Design Strategy for Area- and Performance-Efficient CMOS Circuits," Very Large Scale Integration (VLSI) Systems, IEEE Transactions on, vol. 20, pp. 42-51, 2012.

[20] Xiaomei Liu and S. Mourad, "Performance of submicron CMOS devices and gates with substrate biasing," in Circuits and Systems, 2000. Proceedings. ISCAS 2000 Geneva. The 2000 IEEE International Symposium on, pp. 9-12 vol. 4, 2000.

[21] Jan M. Rabaey, A. P. Chandrakasan and Borivoje Nikolic, Digital integrated circuits: a design perspective Upper Saddle River, N.J.: Pearson Education, 2003, pp. 761.

[22] N. F. Goncalves and H. De Man, "NORA: a racefree dynamic CMOS technique for pipelined logic structures," Solid-State Circuits, IEEE Journal of, vol. 18, pp. 261-266, 1983.

[23] Jan M. Rabaey, A. P. Chandrakasan and Borivoje Nikolic, "Digital integrated circuits: a design perspective" Upper Saddle River, N.J.: Pearson Education, 2003, ch. 4, pp. 222.

[24] S. P. Mohanty, N. Ranganathan, E. Kougianos and P. Patra, Low-power high-level synthesis for nanoscale CMOS circuits, Springer, 2008.

[25] A. T. Tran and B. M. Baas, "Design of an energy-efficient 32-bit adder operating at subthreshold voltages in 45-nm CMOS," in Communications and Electronics (ICCE), 2010 Third International Conference on, pp. 87-91, 2010.

[26] M. Lehman and N. Burla, "Skip Techniques for High-Speed Carry-Propagation in Binary Arithmetic Units," Electronic Computers, IRE Transactions on, vol. EC-10, pp. 691-698, 1961.

[27] S. Majerski, "On determination of optimal distributions of carry skips in adders," Electronic Computers, IEEE Transactions on, pp. 45-58, 1967.

[28] A. Guyot, B. Hochet and J. M. Muller, "A way to build efficient carry-skip adders," Computers, IEEE Transactions on, vol. 100, pp. 1144-1152, 1987.

[28] V. G. Oklobdzija and E. R. Barnes, "Some optimal schemes for ALU implementation in VLSI technology," in Computer Arithmetic (ARITH), 1985 IEEE 7th Symposium on, pp. 2-8, 1985.

SUMMARY OF THE INVENTION

The ability of dual-mode logic circuits to operate in dynamic and static modes gives the opportunity to create efficient logic circuits which balance operating frequency and power consumption requirements. However the unique DML logic gate architecture requires the adaptation of static circuit design strategies to incorporate dynamic parameters in addition to the static parameters for logic blocks in the cell library.

According to an aspect of some embodiments of the present invention there is provided a method for designing a dual-mode logic circuit, wherein the logic circuit is selectably operational in static and dynamic modes, the method comprising:

providing a basis library comprising a DML logic gate inverter and a plurality of dual-mode logic (DML) bicells, each of the DML bicells comprising:
  i) a type-A DML logic gate including a clock input and being independently selectable for static or dynamic mode; and
  ii) a type-B DML logic gate including an inverted clock input and being independently selectable for static or dynamic mode;

forming a pseudo-static library from the basis library by:
  i) modifying each bicell of the basis library by removing respective clock and inverted clock inputs into the bicells; and
  ii) specifying respective values of at least one dynamic timing parameter for the DML inverter and for each of the modified pseudo-static library bicells;

forming a dynamic library from the basis library by specifying respective values of a plurality of dynamic timing parameters for the DML inverter and for each bicell of the basis library;

defining a logic behavior of a required logic circuit;

obtaining an initial logic circuit design by synthesis of the pseudo-static library and the defined logic behavior; and forming a dynamic circuit design by replacing modified pseudo-static library bicells in the initial logic circuit design with corresponding bicells from the dynamic library.

In an embodiment, the basis library includes respective dynamic timing parameter data for the DML inverter and for each of the bicells.

In an embodiment, specifying a respective dynamic timing parameter value comprises retrieving dynamic timing data from the basis library.

In an embodiment, the at least one respective dynamic timing parameter of the pseudo-static library comprises an evaluation period.

In an embodiment, the at least one dynamic timing parameter of the pseudo-static library bicells further comprises an evaluation power.

In an embodiment, the dynamic timing parameters of the dynamic library bicells comprise setup time and hold time.

In an embodiment, the DML logic gate inverter comprises a headed Type-B inverter.

In an embodiment, a DML logic gate comprises:

a static gate comprising at least one logic input and a logic output; and a switching element associated with the static gate, comprising a first input connected to a constant voltage, a second input for inputting a mode selection signal, and an output connected to a logic output of the static gate, the switching element being configured to:
  i) disconnect the static gate output from both of the first and second inputs when the mode selection signal applies a constant voltage to the second output, thereby to select static mode operation; and
  ii) connect the static gate output to both of the first and second inputs when the mode selector signal applies a dynamic clock signal to the second input, thereby to select dynamic mode operation.

In an embodiment, for a type-A DML logic gate the static logic gate comprises a type-A gate and wherein for a type-B DML logic gate the static logic gate comprises a type-B gate.

In an embodiment, the bicells in the initial logic circuit design are cascaded so as to alternate type-A DML logic gates with type-B DML logic gates.

In an embodiment, for each of the bicells the Type-A and Type-B DML logic gates are cascaded to form an A-B pair.

In an embodiment, the forming a dynamic circuit design further comprises adding a footer to each type-A input of a bicell logic gate which follows a register in the initial logic circuit design.

In an embodiment, the initial logic circuit design is provided as a text file, and the replacing modified bicells in the initial logic circuit design comprises editing the text file to include the respective bicell clock inputs.

In an embodiment, the logic behavior is provided in a high-definition language (HDL) format.

In an embodiment, the synthesis is performed with an Electronic Design Automation (EDA) tool.

In an embodiment, the basis library includes respective static timing parameter data for the DML inverter and for each of the bicells, and further comprising:

forming a static library from the basis library by:
i) modifying each bicell of the basis library by removing respective clock and inverted clock inputs into the bicells; and
ii) specifying respective values of at least one static timing parameter for the DML inverter and for each of the modified static library bicells; and
determining a static operating frequency from the dynamic logic circuit design and the static library.

An embodiment may comprise completing the logic circuit design from the dynamic circuit design and the dynamic library, wherein the completing the logic circuit design comprises at least one of: circuit placing and routing.

An embodiment may comprise analyzing the initial logic circuit design to identify critical paths, wherein the forming a dynamic circuit design comprises retaining at least some pseudo-static bicells outside the critical paths in static configuration.

In an embodiment, all modified pseudo-static library bicells along the critical path are replaced with corresponding bicells from the dynamic library.

In an embodiment, the critical path is constructed from DML cells.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system.

In an exemplary embodiment of the invention, one or more tasks according to exemplary embodiments of method and/or system as described herein are performed by a data processor, such as a computing platform for executing a plurality of instructions.

Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 8 is a simplified diagram illustrating four DML modes of operation, according to embodiments of the present invention;

FIGS. 15A-15B present an exemplary DML bicell library, according to embodiments of the present invention;

DESCRIPTION OF SPECIFIC EMBODIMENTS OF THE INVENTION

Figure 1:
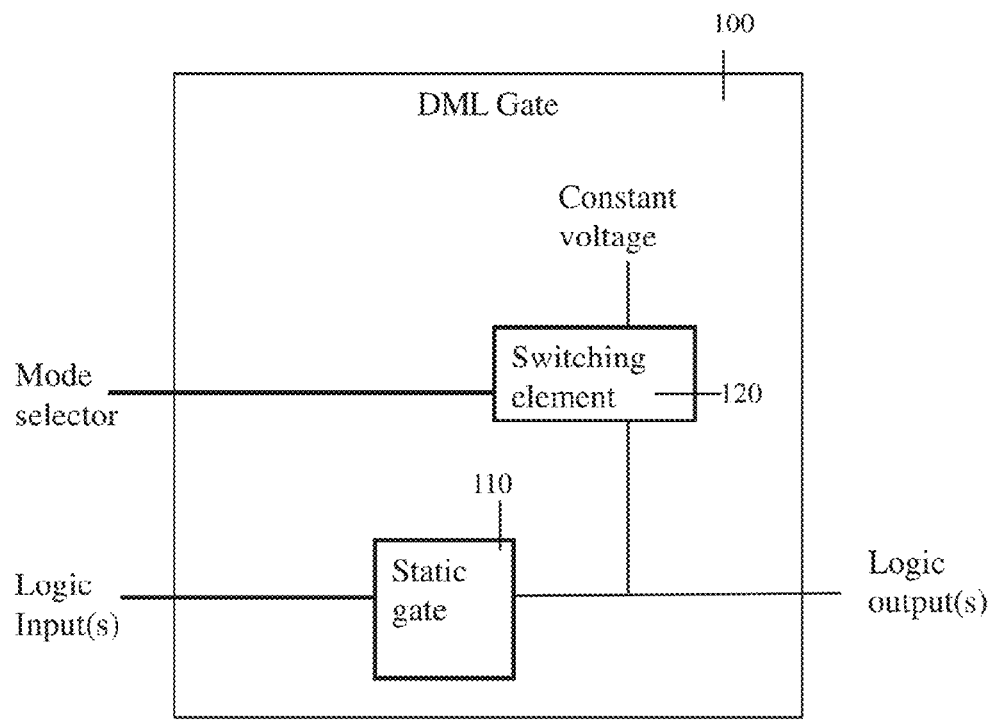
FIG. 1 is a simplified block diagram of a dual-mode logic gate, according to embodiments of the present invention.

The present invention, in some embodiments thereof, relates to a method of designing dual-mode logic circuits and, more particularly, but not exclusively, to a method of designing dual-mode logic circuits using electronic design automation tools.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

1. The Dual-Mode Logic Gate

Currently logic circuits are designed to work in either static or dynamic mode.

Each mode has advantages and disadvantages. Dynamic mode operates rapidly at the cost of high power consumption and design complexity. Static mode operation operates at lower power with a greater circuit delay.

The Dual Mode Logic (DML) Design Flow embodiments presented herein are designed for DML logic gates. A DML logic gate may be switched between static and dynamic modes of operation. In static mode, the DML gates and circuits feature low power dissipation with moderate performance, while in dynamic mode they achieve higher performance, albeit with increased power dissipation. This unique feature of DML provides the option to control system performance on-the-fly and thus support applications where a flexible workload is required.

Embodiments of the DML logic gate are now described.

Reference is now made to FIG. 1, which is a simplified block diagram of a dual-mode logic gate, according to embodiments of the present invention. The general DML gate architecture includes:

1) A static gate 110;
2) A switching element 120 with a mode selection input and a constant voltage input.

DML logic gates may be implemented as type-A (possibly footed) or type-B (possibly headed). The type-A DML gate has a type-A static gate, and a type-B DML gate has a type-B static gate.

Switching between the two functional modes, static and dynamic, is performed by applying the required signal at the input of switching element 120.

When static mode is selected an appropriate constant voltage (high or low as required by static gate topology) is applied to the mode selection input. The constant voltage causes switching element 120 to disconnect the static gate output from the constant voltage, thus enabling static operation. During dynamic operation, switching element 120 inputs a dynamic clock signal 130, which periodically connects the static gate output to the constant voltage level, thus enabling dynamic operation.

In some embodiments, static gate 110 is a CMOS gate. It is to be understood that the CMOS gate serves as a non-limiting exemplary embodiment of a static gate. DML logic gates may be implemented with other types of static gates.

In some embodiments, switching element 120 is implemented by a transistor. It is to be understood that the transistor serves as a non-limiting exemplary embodiment of a switching element. Other embodiments may be used.

Reference is now made to FIGS. 2A-2D, which are simplified diagrams of embodiments of a DML logic gate. In FIGS. 2A-2D a static core gate is supplemented with an additional precharge\predischarge transistor ($M_1$), which serves as the switching element and enables dynamic operation. The full swing (rail-to-rail or R2R) of the static logic core gate is highly desirable. During static operation, transistor $M_1$ is disabled and the DML gate operates similarly to the static logic core gate. As in other dynamic families, DML gates may be designed with or without a footer (or header). The footer is used to decrease pre-charge time by eliminating the ripple effect of the data advancing through the cascaded nodes, and allowing faster pre-charging.

Figure 2A:
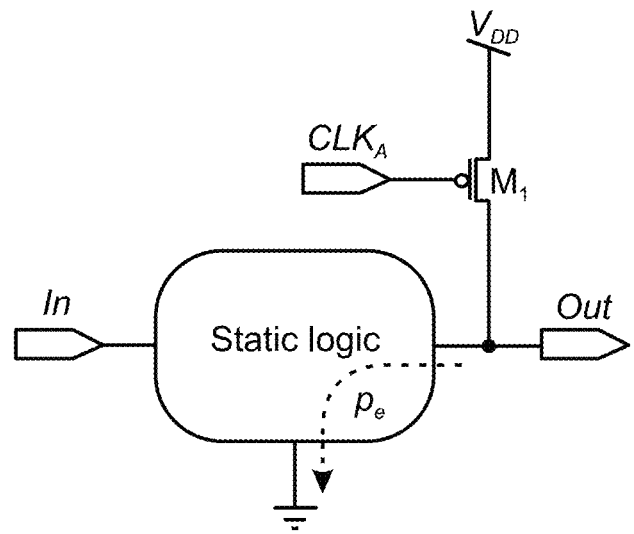
FIGS. 2A-2D are simplified circuit diagrams of dual-mode logic gates, according to respective embodiments of the present invention.
Figure 2B:
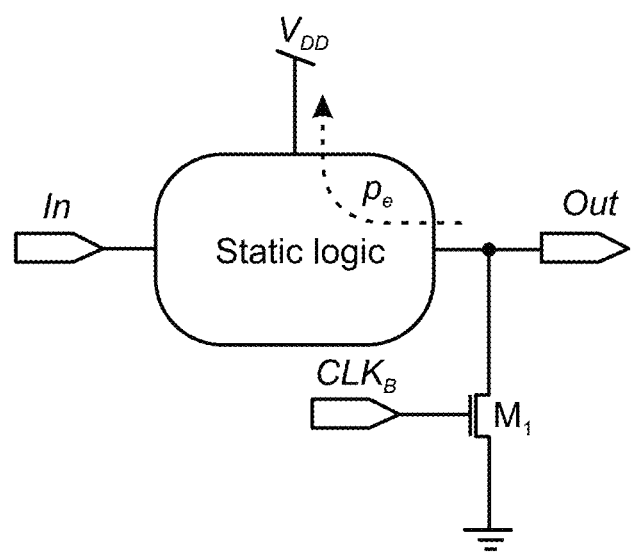
Figure 2C:
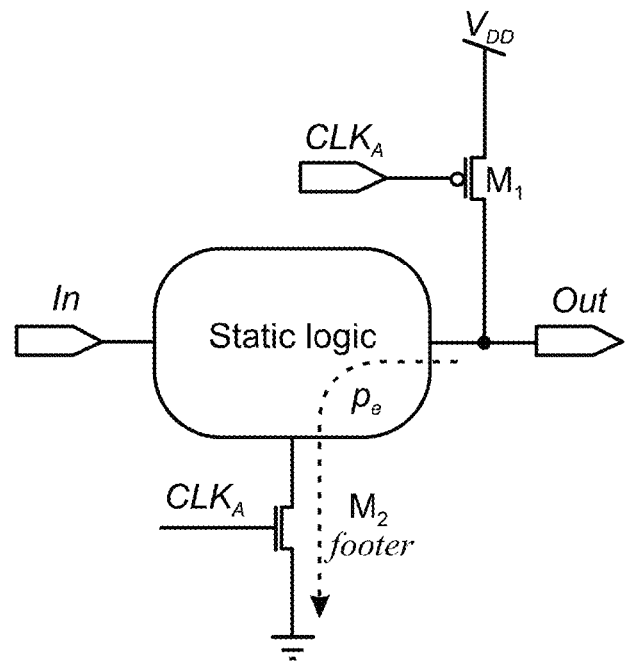
Figure 2D:
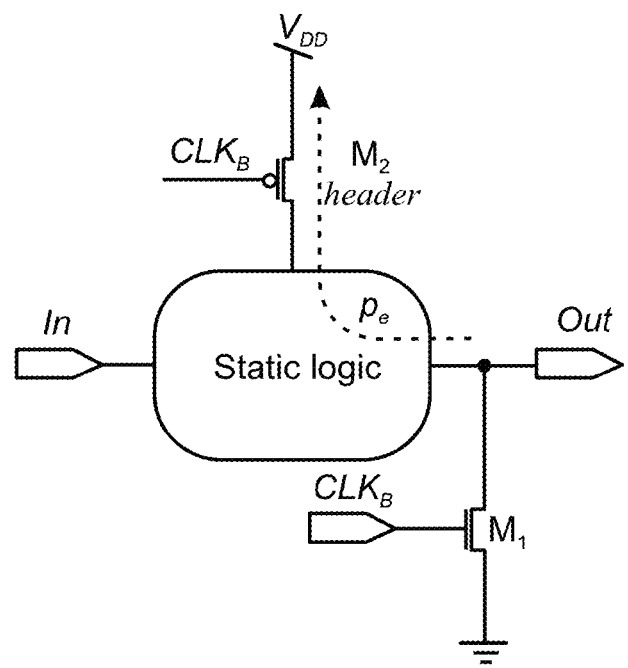

Operating the DML footed gates of FIGS. 2C-2D in static mode is quite intuitive. The precharge\predischarge transistors are disabled: $CLK_A$ is fixed HIGH and $CLK_B$ is fixed LOW. As a result, the gate retains the functionality of its static core gate, except for an extra negligible parasitic capacitance.

In the following description an un-footed logic gate topology is utilized, unless noted otherwise. Footers are typically not used due to the negative impact on a gate's performance. It is noted that in some embodiments footers are explicitly added to the logic gate design, as described below.

The DML R2R property is highly desirable due to lower leakage power and supreme robustness. A proper DML dedicated transistor sizing policy may result in a substantial performance gain during the dynamic mode relatively to its CMOS counterpart and has modest energy consumption during the static mode. In other words, an optimal dynamic mode sizing for performance optimization meets a semi-optimal static mode sizing for energy minimization. Similarly, an optimal sizing policy for dynamic operation could be addressed to any other static logic family.

The most efficient DML gates are typically the ones with a pre-charge (or pre-discharge) transistor connected in parallel with a group of serially stacked transistors which are minimally sized (whether pull-up or pull-down). Therefore the evaluation network is usually dominated by parallel paths, which contribute to a very fast evaluation period (small evaluation path resistance and reduced output capacitance). In other embodiments the pre-charge (or pre-discharge) transistor could be placed in parallel to a parallel paths network, but this may result in relatively slow DML gates.

For example, A DML Type-A NOR2 gate is very fast in comparison to a DML Type-B NOR2 gate.

An effective design policy takes such factors into account.

1.A. Design Constraints

Figure 3:
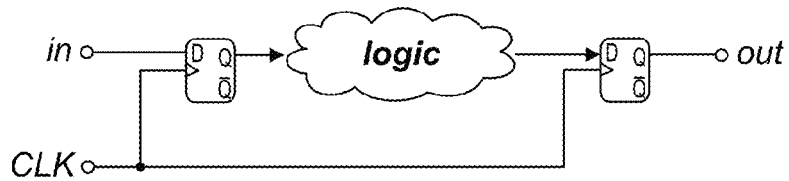
FIG. 3 is a simplified diagram illustrating a CMPS logic circuit design concept.

Reference is now made to FIG. 3, which is a simplified diagram illustrating the CMOS logic circuit design concept.

The DML design concept is similar to a regular ASIC automated design concept, which consists of a logic domain locked between two synchronous registers. The DML concept includes two CLK signals, a slow clock for static mode and a fast clock for dynamic mode. Only one CLK is utilized at a time, according to the desired operational mode. The embodiments described herein utilize a DML bicell as described below. The bicell architecture may also remove some CLK skew vulnerability during dynamic operation.

1.B. Cascading

In some embodiments, the DML circuit is optimized to improve performance (speed) in dynamic mode, while introducing reasonable performance degradation during static operation.

Generally, all logic gates can be designed either as Type-A or Type-B. As a result, during the construction of an arbitrary logical circuit two cascaded gates of the same type may appear. Such a connection is capable of initiating a failure mechanism while pre-charging, or pre-discharging. The pre-charged HIGH output of the first Type-A gate may activate the evaluation path $p_e$ (see FIGS. 2A-2D) of the following gate and prevent its output from pre-charging, thus creating significant short circuit current ($I_{SC}$). A similar failure occurs in a consecutive pair of Type-B gates, where LOW output of the first gate enables the $p_e$ of the following gate and opposes its output pre-discharging. Once this has occurred, the failure spreads into the entire logic path and disrupts its functionality.

One method of preventing this cascading problem is to alternate Type-A and Type-B gates. An alternative approach is the use of footed gates, but this may deteriorate the switching speed as the $p_e$ paths become more resistive.

Correct cascading of DML gates (of both types) by an EDA tool (or any netlist scriptural manipulation) is hard to perform. One of the reasons is that if we observe a particular gate during pre-charge, at least several of its inputs must be of a complementary type such that the evaluation network is cut-off. Some inputs may be a result of odd logic stages and others may be even (meaning different types). It is very difficult to keep the track of cascading correctness within an unbounded design.

Furthermore, the characterization process for a STD-cell-library of such unbounded design will be highly complicated.

In order to overcome these difficulties, and due to the fact that an appropriate optimization requires immense algorithm complexity, design embodiments described herein are based on self-contained double gate structures (denoted bicells). Cascading of these bicell structures is correct by design (i.e. overcomes cascading issues) with no need of any additional actions.

Figure 4:
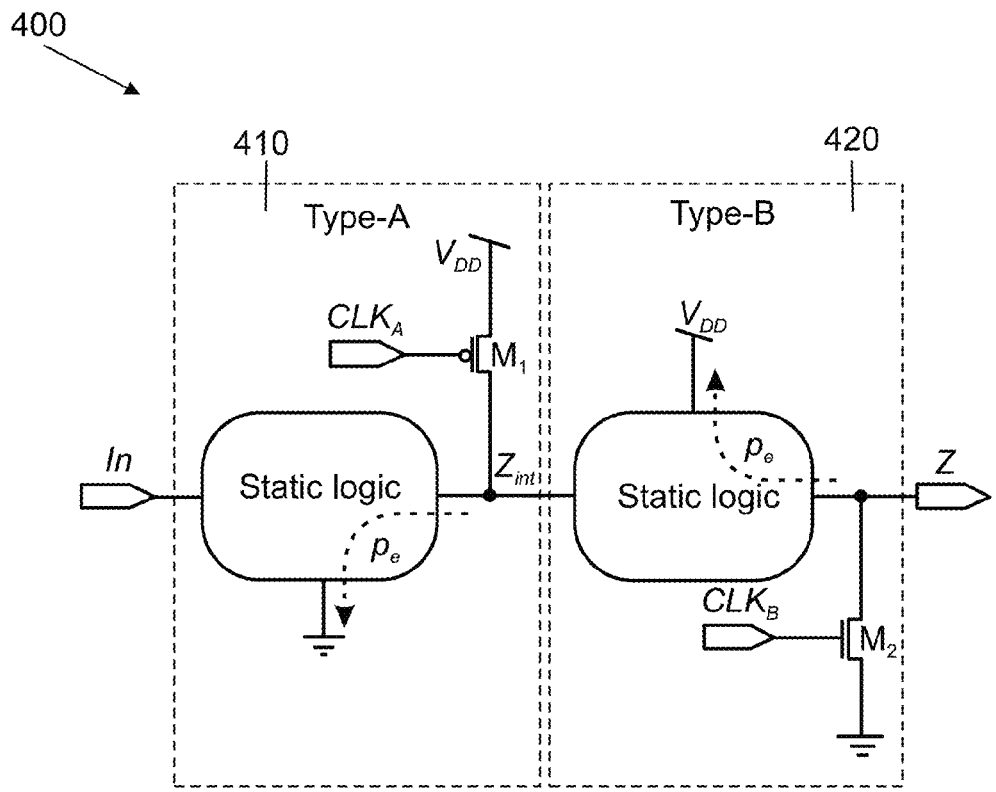
FIG. 4 is a simplified circuit diagram of a DML A-B bicell, according to embodiments of the present invention.

A bicell includes a type-A DML logic gate and a type-B DML logic gate, cascaded as either an A-B or B-A pair. FIG. 4 is a simplified diagram of a DML A-B bicell, according to embodiments of the present invention. A type-A DML gate 410 is cascaded with type-B DML gate 420 to form bicell 400.

For a given design process, all the DML bicells are cascaded in the same order. As shown above, the type-A DML logic gate includes a clock input (denoted $CLK_A$) and the type-B DML logic gate includes an inverted clock input (denoted $CLK_B$). Inputting the correct signals into the $CLK_A/CLK_B$ selects whether the bicell operates in static or dynamic mode The following describes design embodiments based on A-B bicell structure (Type-A followed by Type-B). However other embodiments are possible in which the DML gates are cascaded to form a B-A pair. Utilizing only one type of bicell in circuit design (i.e. only A-B or only B-A) automatically eliminates cascading issues.

1.C. Footed Gates

Unfooted DML gates are much faster than footed versions. In some embodiments unfooted DML gates are set as the bicell default. When the DML logic domain interfaces with the CMOS logic domain an extra precaution is required. Some inputs of an unfooted DML gate will cut all the evaluation paths during pre-charge (or pre-discharge) of the output node. This limits the capability of the unfooted gate to be driven by any static logic (or sequential device as a register), because it may produce an uncontrolled input signal. The arbitrary logical '1' or '0' levels at the gate inputs might prevent the unfooted bicell from pre-charging.

It is noted that static logic elements (such as a register) may be added by standard design tools at several stages of the design process (e.g. generation of the HDL code and/or synthesis).

In order to overcome this obstacle, a footed version of the bicell is used when interfacing with incoming static or sequential logic devices.

1.D. Inverter

Due to their structure, bicells are non-inverting logic elements. Non-inverting logic leads to no logic universality, which is effectively useless during circuit design. In some embodiments a stand-alone inverter cell is used to obtain logic universality.

However the use of an inverter is not trivial due to the cascading problems discussed above. In an A-B bicell topology an unfooted inverter of either type will violate the cascading conditions, creating A-A or B-B connections. In order to overcome this problem a footed inverter may be used. Under the A-B cascading policy a Type-B inverter may be preferred, since the use of a Type-A inverter requires the following bicell to start with a Type-A footed gate. This may cause the following bicell (in most cases more complex than the inverter) to be inefficient in terms of energy/performance.

Adding a header to the standalone Type-B inverter may be insufficient to obtain correct dynamic mode glitch-free functionality, and additional timing parameters may be required to obtain glitch-free functionality.

Figure 5:
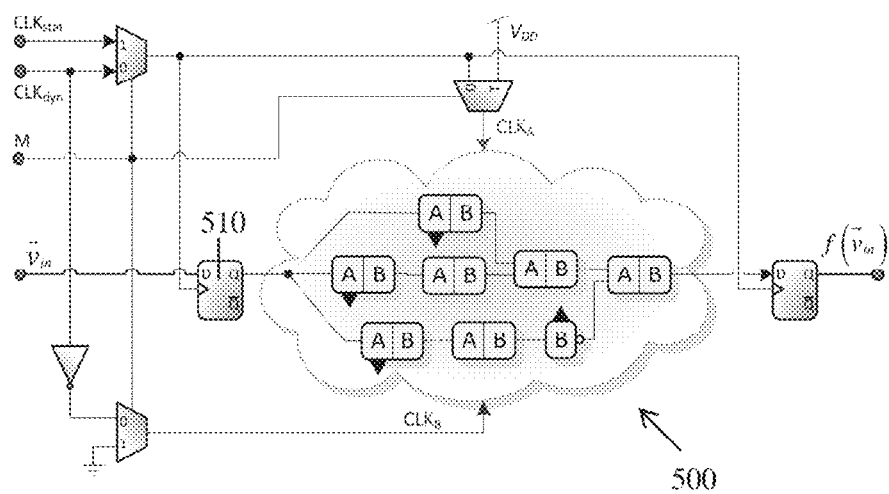
FIG. 5 is a simplified circuit diagram illustrating DML logic circuit design principles, according to embodiments of the present invention.
Figure 5:
Figure 5:
Figure 5:

Reference is now made to FIG. 5 which is a simplified circuit diagram illustrating DML logic circuit design principles, according to embodiments of the present invention. DML logic circuit 500 is formed of A-B bicells and a type-B headed inverter. All bicells following static element 510 have a footed A gate. During dynamic mode the logic circuit receives a clock ($CLK_A$) and an inverted-clock signal ($CLK_B$). During static mode operation logic circuit 500 may input a slower static clock. The M input selects static or dynamic mode of operation for the DML logic circuit.

2. DML Cell Library Alternative Views

Currently, the most common-use synthesizers, such as Cadence RC Compiler or Synopsis Design Vision, are designed to work with static (asynchronous) libraries for logic construction.

In contrast with the standard design process which utilizes a single standard library (e.g. CMOS .lib), the DML design embodiments described herein utilize different libraries at different stages of the design process.

In the following the term "library element" may refer to any DML gate included in the given library. In embodiments described herein a library element may be a DML bicell or a DML inverter.

2.A. Basis Library

In order to comply with the traditional flow of digital logic generation (e.g. creating a netlist from an RTL code), a DML basis library is defined. The basis library includes a selected set of bicells which are fully characterized with all the necessary parameters (dynamic/static/sizing/etc.). The basis library also includes a DML inverter, in order to enable negative logic operations within the logic circuit.

2.B. Pseudo-Static Library

An asynchronous pseudo-static view is derived from the basis library. The pseudo-static library is categorized as pure static logic (like CMOS) but incorporates one or more dynamic parameters, such as switching delays and corresponding power assessments. This view is a dummy-view and used only for logic synthesis; it has no CLK signals designation.

The pseudo-static library modifies each basis library element into static form. Clock/inverted-clock inputs are removed from each DML bicell. Similarly, the clock input is removed from the DML inverter.

In order to obtain a circuit design which is capable of working in a dynamic mode, the pseudo-static library includes respective values of at least one dynamic timing parameter for each pseudo-static library element. Respective dynamic parameter data for each library element (i.e. modified DML gate or modified DML inverter) is obtained from the basis library. Other parameter data may also be included in the pseudo-static library as needed for the design process.

2.C. Dynamic Library

A dynamic (synchronous) library is also derived from the basis library (and/or the pseudo-static library). The dynamic library retains the dual-mode configuration of the DML items in the basis library. Each modified bicell in the pseudo-static library has a corresponding bicell in the dynamic library.

The dynamic library includes respective values of multiple dynamic timing parameters for each bicell and the DML inverter. The dynamic library describes the cell's true dynamic functionality, and may include various synchronous timing parameters, such as setup and hold times, etc.

2.D. Static Library

An optional static library may also be formed. The static library is not used during the design process. However it may be used for analyzing the static operation of the DML logic design while its CLK inputs are disabled. The static view timing parameters are similar to any static logic family timing format (e.g. CMOS).

3. DML Circuit Design

Figure 6:
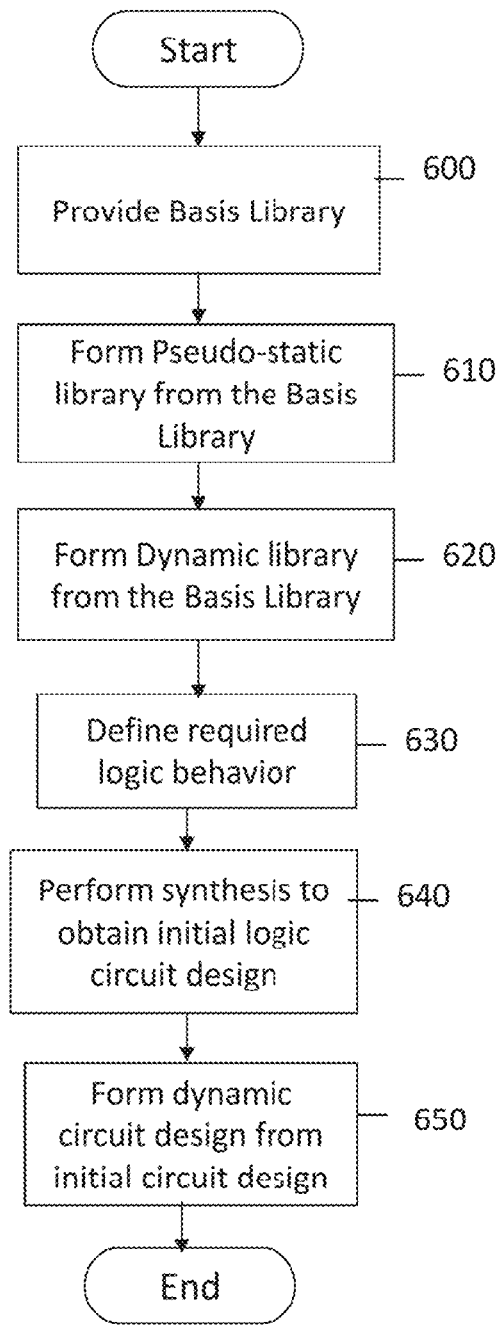
FIG. 6 is a simplified flowchart of a method for designing a DML logic circuit, according to embodiments of the present invention.

Reference is now made to FIG. 6 which is a simplified flowchart of a method for designing a DML logic circuit, according to embodiments of the present invention. The logic circuit may operate in both in static and dynamic modes.

In 600 a basis library is provided. The basis library includes a DML logic gate inverter and dual-mode logic (DML) bicells. Each DML bicell includes a type-A DML logic gate and a type-B DML logic gate. Type-A logic gates include a clock input and type-B DML logic gates include an inverted clock input.

In one embodiment all the basis library bicells are in an A-B configuration. However other embodiments are possible in which all the basis library bicells are in the B-A configuration. Using the same configuration for all the bicells eliminates the cascading problems discussed above.

The basis library further includes a DML inverter. Since integrating the DML inverter within the DML logic circuit may cause cascading problems, the DML inverter preferably includes a header (for a type-B inverter) or a footer (for a type-A inverter).

The basis library also specifies the required parameter values for each of the library items.

In 610 the pseudo-static library is formed from the Basis library. The clock and inverted-clock inputs are removed from the bicells. The respective value of at least one dynamic timing parameter is specified for each pseudo-static library item. In some embodiments the dynamic timing parameter is the evaluation period. In other embodiments the evaluation power is alternately or additionally specified.

In 620 the Dynamic library is formed from the Basis library. The clock and inverted-clock inputs are retained on the bicells. The respective values of multiple dynamic timing parameters are specified for each dynamic library item.

In 630 the logic circuit's required logic behavior is defined. In some embodiments the logic behavior is provided in a high-definition language (HDL) format. This format is suitable for use by most circuit synthesis tools.

In 640 an initial circuit design is obtained using a synthesis tool. Inputs to the synthesis tool include the pseudo-static library and the defined logic behavior. The initial circuit design defines an interconnection of pseudo-static library items, where the pseudo-static items include at least one dynamic parameter. In other words, the initial design is based on the modified bicells defined in the pseudo-static library.

In 650 a dynamic circuit design is created by replacing modified pseudo-static library bicells present in the initial logic circuit design with corresponding bicells from the dynamic library. The resulting dynamic circuit design incorporates the dynamic parameter data from the dynamic library. The replacement may be performed by textual manipulation of an initial design netlist.

After the dynamic circuit design is obtained in 650, additional steps such as placing and routing may be performed may be performed to complete the logic circuit design.

IV. DML DESIGN FOR ENERGY EFFICIENCY AND HIGH PERFORMANCE

Dynamic mode operation requires high power relative to static operation.

The following describes embodiments for DML (or partial DML) logic circuit design which serve for meeting delay requirements for critical paths (CPs) along with lowering the over-all energy consumption of the design by utilizing the powerful modularity of DML. Embodiments of DML (or partial DML) logic circuit operation are also presented.

In some embodiments, the logic circuit's critical paths are identified and the DML logic gates on these paths are operated in dynamic mode to obtain boosted performance. Non-critical paths may be operated in the low energy static DML mode, which does not affect the performance of the design. Since in most cases the majority of gates in the design are not on the CPs, the increase in energy consumption of the critical paths will be negligible in comparison to the general circuit consumption. Moreover, DML static gates dissipate less power than their CMOS counterparts, resulting in reduced power dissipation of the whole design. In an alternate embodiment some or all of the logic gates which are not on critical paths are implemented in static form.

DML gates have a very robust operation in both static and dynamic modes under process variation (PVT) and at low supply voltages. Dynamic mode robustness is mainly achieved by the intrinsic active restorer (pull-up in "Type A" \ pull-down in "Type B"). This restorer also allows sustaining glitches, charge leakage and charge sharing. Appropriate sizing of the DML gate transistors is a key factor for achieving low energy consumption in the static DML mode (in which the topology of the gate is identical to the static gate). Such sizing may also reduce of all capacitances of the gate.

Similarly, the unique transistor sizing enables evaluation through a low resistive network achieving fast operation in the dynamic mode.

Figure 7A:
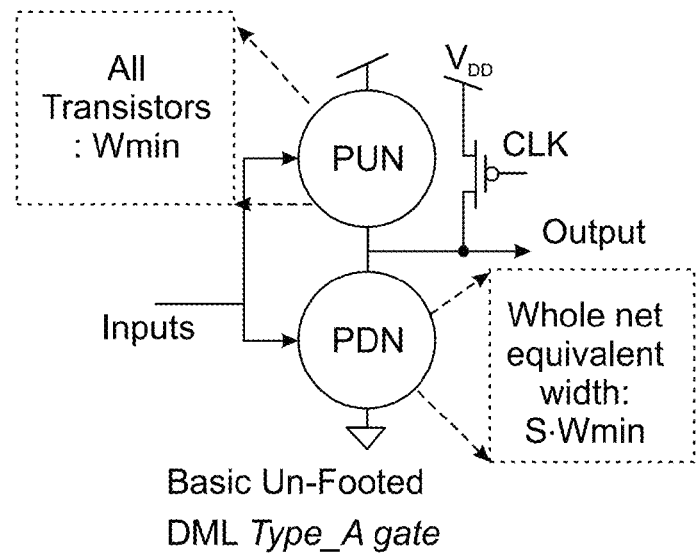
FIGS. 7A and 7B are simplified diagrams illustrating the sizing of un-footed type-A and type-B DML gates, according to respective embodiments of the present invention.
Figure 7B:
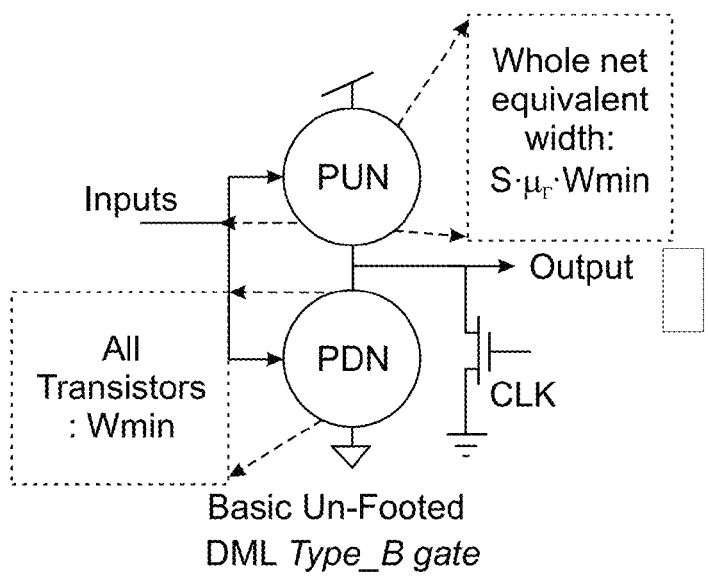
Figure 7C:
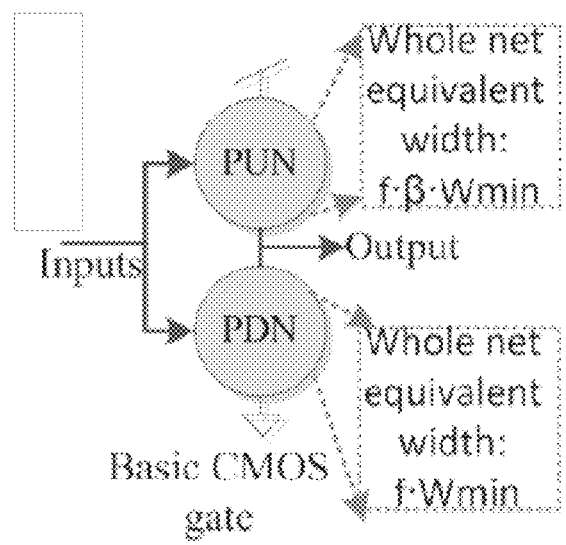
FIG. 7C is a simplified diagram illustrating the conventional sizing of a standard CMOS gate.

Reference is now made to FIGS. 7A and 7B which are simplified diagrams illustrating the sizing of un-footed type-A and type-B DML gates, according to respective embodiments of the present invention. FIGS. 7A and 7B illustrating the sizing of CMOS based DML gates in "Type A" and "Type B" configurations respectively. These are optimized for dynamic operation. FIG. 7C shows the conventional sizing of a standard CMOS gate where, $W_{MIN}$ is a minimal transistor width, $\beta$ is the PUN to PDN inherent up-sizing factor and f is the gate's general up-sizing factor. The in\out capacitances of DML gates are significantly reduced, as compared to CMOS gates, due to the utilization of minimal width transistors in the pull-up of "Type A" or pull-down of "Type B" networks. The size of the pre-charge transistor is kept equal $S \cdot W_{MIN}$ in order to maintain a fast pre-charge period, despite the output load upsized gate where, S is the evaluation network upsizing factor.

IV.A. Static DML as a Semi-Energy-Optimal CMOS

The design space of a CMOS gate is mainly influenced by $V_{TH}$, transistor width, $V_{DD}$, channel length, oxide thickness and body voltage. The influence of these parameters on E-D plain-optimization is being explored. For the CMOS family, the symmetry of the gate (i.e. equal rise and fall times) is highly important. This is due to the fact that in a combinational system there is always some uncertainty regarding the transition type. As a result, the pull-up network (PUN) of CMOS gates, which is constructed by low mobility PMOS devices, is sized up by the $\beta$ parameter. When optimizing a CMOS gate's energy at the expense of its performance, the transistor's width is the main parameter used for reducing the energy consumption. This is due to several factors:

(1) Switching energy is proportionate to the load and quadratic dependent on $V_{DD}$. Under energy optimization, the symmetry of the gates' performance does not constitute a constraint so the transistor's width can be reduced, as well as $\beta$. This significantly lowers the load capacitances.

(2) With circuit's $V_{DD}$ lowering and technology scaling, leakage energy has become one of the key factors for static power dissipation. The leakage energy is caused by the numerous leakage currents of a device. The main leakage currents are the sub-threshold and gate leakage currents. These currents are linearly-dependent on the transistor's width. Under energy optimization, again, the transistor's width can be much reduced, as well as $\beta$.

Static mode CMOS-based DML with transistor sizes optimized for the dynamic mode is de facto a semi-energy-optimal CMOS structure with an additional negligible output capacitance for the Clk transistor. DML static mode is still highly robust due to its complementary nature and withstands aggressive voltage scaling. The embodiments below serve to reduce the energy consumption of non-critical paths. The E-D tradeoff space under this approach is very wide and in this paper the discussion is limited only to transistors sizing, as shown in FIGS. 7B-7C for DML gates.

IV.B. CP-DML Approaches for Energy Efficiency and High Performance

Embodiments of design approaches for energy efficient and high performance design of combinatorial systems are now discussed. First, an approach which utilizes DML gates in the dynamic mode on the CPs in order to improve their delays is described. Then various aspects of energy reduction of non-CP portions of the design are presented.

Figure 8:
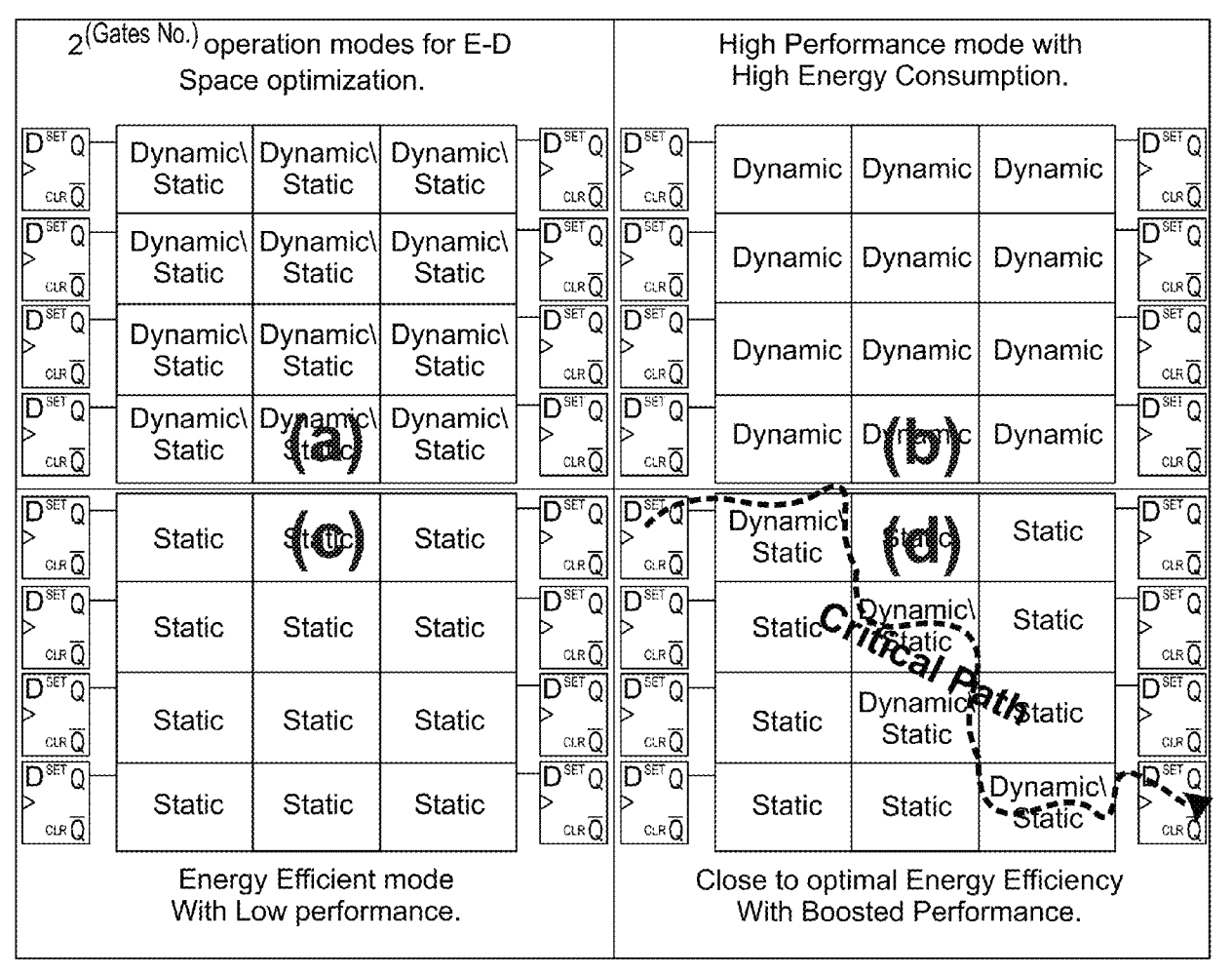

FIG. 8 is a simplified diagram illustrating four DML modes of operation, according to embodiments of the present invention.

Figure 9:
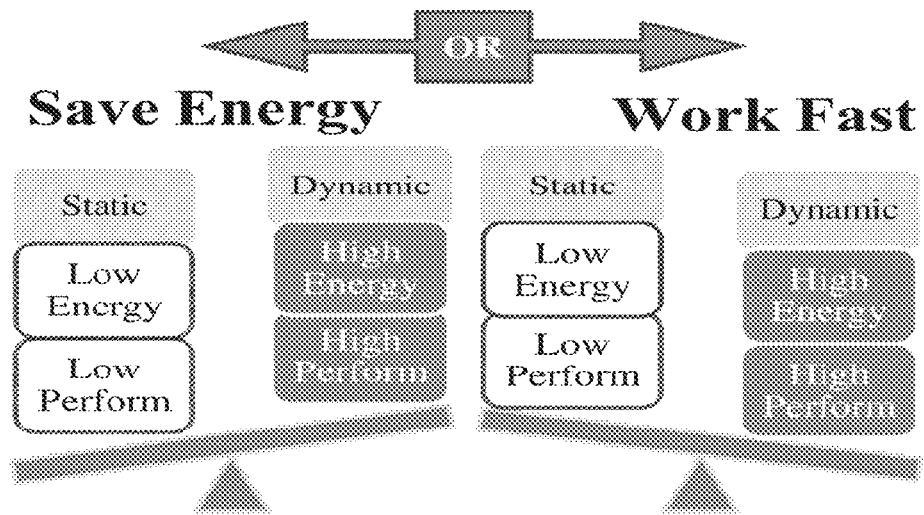
FIG. 9 is a simplified illustration of the tradeoff between static and dynamic modes of logic circuit operation.

A general DML design may be controlled (input signal-driven control or external signal-driven control) to operate each gate in one of two modes: Static and Dynamic. This means that a general design can be operated in $2^{(Gates\ Number)}$ different options, each one leading to a different operating point in the E-D space of the design. Quadrant 8(a) illustrates this modularity. Degenerated approaches for operating all the gates in one of the two modes, similar to a sole gate, are shown in 8(b) and 8(c). Switching between these two modes leads to the distinct tradeoff shown in FIG. 9, meaning that the design is optimized either to achieve maximum performance or minimum energy consumption.

IV.C. Solving CP Timing Violations

In some embodiments, the CPs of a static logic circuit design are automatically identified using standard design flow tools. By replacing these paths with DML gates and applying the dynamic mode on these paths, the delay may be reduced. The rest of the design may be implemented using standard CMOS static logic (or DML logic in static mode) along non-critical paths. As described above, special design constraints should be enforced in all the intersections between a static path and a dynamic one. In some of these cases, a footer should be applied. FIG. 8(d) presents a design in which the CPs were located and only those paths were given the option to toggle between dynamic and static mode, according to the system requirements. If the system can withstand slower operation, the CP logic may operate in static mode. If the system is required to meet the defined Clk period for all cycles, the CPs may operate in the dynamic mode. This may be useful, for example, for a smart phone that operates with two frequencies: slow frequency for power save/hibernating mode and a fast frequency for video streaming.

Low complexity systems will normally have only one frequency of operation and therefore the CPs will constantly operate in the dynamic mode. Typically, the number of gates on the CP is small compared to the total amount of gates in the circuit design. Therefore, in most cases, the inherent dynamic-operation energy of CPs is expected to lead to an insignificant increase in total energy consumption of the design.

IV.D. Solving the CPs Timing Violation while Reducing the Total Energy Consumption Reference is now made to FIG. 10 which is a simplified illustration of the use of the DML gates over the logic circuit's critical paths, according to embodiments of the present invention.

Figure 10:
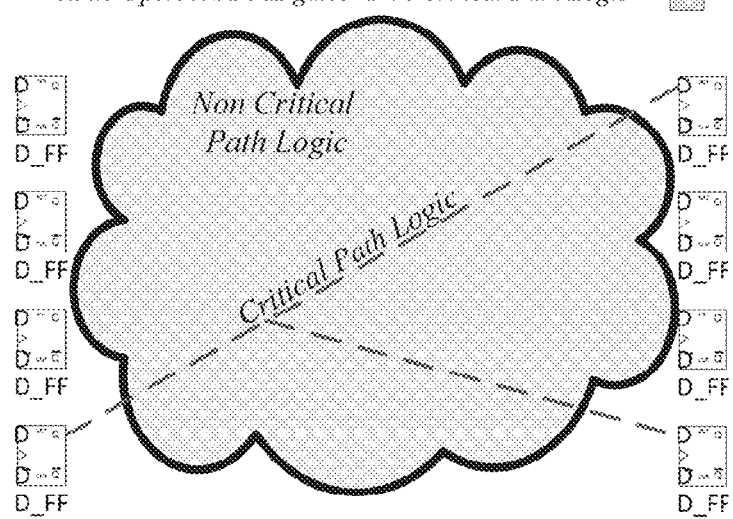
FIG. 10 is a simplified illustration of the use of the DML gates over the logic circuit's critical paths, according to embodiments of the present invention.

As described above, in some embodiments the CPs are mapped and the circuit is designed for operation in the dynamic DML mode over the CPs. In some embodiments, the rest of the circuit utilizes standard CMOS logic gates topology. In other embodiments, all portions of the logic circuit, even those which are not a part of the CPs, are DML logic gates. These DML gates may be mapped for operation as static mode DML gates (similar to semi-energy optimized CMOS gates). In some designs, these non-CPs are not time constrained and therefore the asymmetry behavior of their transitions and consequently their performance degradation will withstand the Clk period. The use of the static DML mode for the mass majority of gates in the design may lead to a significant reduction in the total dynamic and static energy consumption. FIG. 10 illustrates this approach.

In conclusion, a fully compatible DML design flow for standard EDA tools has the potential to make an impact on the automated design capabilities. The design flow embodiments presented herein are fully functional and introduce satisfactory characteristics in terms of performance vs. energy trade-off, according to the operational mode. Additionally, both for automated design and custom design DML logic circuit capabilities leverage the flexibility of logic circuit design to meet critical path timing constraints along with reducing the total energy consumed by the circuit.

It is expected that during the life of a patent maturing from this application many relevant types of circuit design tools, design flows, logic behavior definition codes and logic cells will be developed and the scope of the corresponding terms are intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find calculated support in the following examples.

EXAMPLES

Reference is now made to the following examples, which together with the above descriptions illustrate some embodiments of the invention in a non limiting fashion.

V. DML Circuit Design

The following describes embodiments of DML logic circuit design, in the context of current circuit design tools.

As mentioned above the most common-use synthesizers, such as Cadence RC Compiler or Synopsis Design Vision are designed to work with static (asynchronous) libraries for logic construction. On the other hand sequential cells such as FFs\latches are supplied with extra timing characterization and are mainly used for logic blocks separation, pipelining and power reduction by clock-gating.

In order to comply with the traditional flow of digital logic generation (i.e. creating a netlist from an RTL code), the chosen bicells were fully characterized and Three separate .lib file views were utilized, in contrary to a standard library (e.g. CMOS .lib) where only one characterization view is sufficient.

The asynchronous pseudo-static view is categorized as pure static logic (like CMOS), but incorporates some dynamic parameters, such as switching delays and corresponding power assessments. This view is a dummy-view and used only for logic synthesis, it has no CLK signals designation.

The second view is dynamic (synchronous) and describes the cell's true dynamic functionality, including various synchronous timing parameters, such as setup and hold times etc.

The third view is purely static and as its name suggests. It used for analyzing the static operation of the logic circuit design while the circuit's CLK inputs are disabled. The static view timing parameters are similar to any static logic family timing format (as for CMOS).

In the present exemplary embodiment the synthesis is performed using the pseudo-static view. Next the synthesis-tool generated netlist is supplemented with CLK signals and re-associated with the fully dynamic library views. The required post-process netlist manipulations are performed by a Perl code (or any other scriptural language).

The following does not explicitly refer to the basis library discussed above. The exemplary embodiment described herein begins after the pseudo-static has been derived. It is noted that all the data required (including DML cell structure and timing parameters) are available at the beginning of this exemplary process, and may be considered to constitute the basis library.

V.A. Design Views

Pseudo-Static View

The pseudo-static view contains a standard '.lib' (liberty) file format or '.db'. The layout and schematic parameters for the '.lib' file are generated from the real DML files. The HDL (typically Verilog) code describes the static functionality of the cell (i.e. no clocks) as shown in Table 1. Capacitance parameters are extracted from the DML bicells layout, while static propagation delays such as LOW to LOW ($t_{pLL}$) and HIGH to HIGH ($t_{pHH}$) are imported from the dynamic view. The imported timing parameters are both identical to the dynamic view's evaluation period ($t_{ev}$), as only one transition $t_{pHH}$ may occur in this mode. This transition is comprised of evaluation sub-periods of the consecutive Type-A and Type-B gates ($t_{ev,A}$, $t_{ev,B}$).

TABLE 1

| Verilog equivalent behavioral model | module OR3 (A, B, C, Z); input A, B, C; output Z; or(Z, A, B, C); endmodule |
|---|---|
| Netlist post-processing entities | |
| Original pseudo-static netlist | OR3 v750(A, B, C, Z); |
| Dynamic view netlist | OR3 750_D(A, B, C, CLKA, CLKB, Z); |

With regard to Table 1, note that the synthesizer library directory is changed by adding an '_D' extension to the cell name, and that the 'CLKA' and 'CLKB' signals are inserted into the netlist as inputs as is their binding to corresponding local CLK nets.

For example, if an A-B bicell is characterized, then during the evaluation of its output Z, the initial transition would be from HIGH to LOW on the internal node $Z_{int}$. Output node Z responds with a LOW to HIGH transitions (see FIG. 4). Both these transitions make up the HIGH to HIGH bicell transition (denoted the dynamic transition), which would be very fast. In contrast, the complementary LOW to LOW transition (denoted the static transition) would be available only in the static mode of operation and it would be very slow.

In the present example, the DML design is performance-oriented during dynamic mode of operation. The synthesizer bases its calculations on dynamic time-parameters. This is done by setting both static transition times $t_{pLL}$ and $t_{pHH}$ as a dynamic $t_{ev}$ timing parameter. Thus the synthesizer actually performs the timing analysis with the dynamic delay parameters and as a result the corresponding design meets the dynamic timing constraints. This stage of synthesis should be timing (and area as an option) driven, as the power characterization at this point is pessimistic.

Dynamic View

In the following, returning the modified logic cells to their DML form is performed by editing the netlist obtained during the pseudo-static synthesis process. Dynamic parameters are also included.

The dynamic view contains a standard '.lib' file. The layout and schematic parameters for the '.lib' file are generated from the real DML files. Capacitances and timing parameters such as pre-charge ($t_{pc}$) and evaluation ($t_{ev}$) periods are extracted and evaluated from the DML layout. A number of supplementary timing parameters similar to FF's $t_{hold}$ and $t_{setup}$ intervals are also defined in order to ensure correct and glitch-free dynamic functionality. This view is used as the input library ('.lib') to the rest of the design flow. The dynamic view is derived from the pseudo-static view by scriptural manipulations such as, extending the bicells names with a '_D' term and by the insertion of CLKA and CLKB signals.

Static View

This view is used to determine the static mode operation frequency after the dynamic-oriented synthesis is complete. The static view is similar to the pseudo-static view except for the timing parameters ($t_{pLL}$ and $t_{pHH}$) which are characterized for purely static switching as the clocks are disabled ($CLK_A$='1' and $CLK_B$='0'). The transition to the static view is done by changing the source directory of the standard library to one which comprises of statically characterized bicells.

V.B. SDF Integration

An exemplary method for achieving a fully functional DML logic circuit, synthesized with standard off-the-shelf EDA tools (RTL-transparent method), is presented below. The design undergoes some restrictions in order to meet the described objectives faster and more easily (as described above).

Cascading Policy

DML bicells were introduced for easier SDF integration while avoiding the cascading issues discussed above. Some considerations, which stand behind the choice of an A-B cascading policy vs. a B-A one are now presented.

It is important to note that the full cell library may be created symmetrically with B-A bicells, but the chosen strategy has more abundant logic efficiency. The main considerations between these two approaches are given in Table II.

TABLE 2

| Attributes | A-B | B-A |
|---|---|---|
| (i) | Dominated by OR based functions | Dominated by AND based functions |
| (ii) | Efficient OA (OR-AND) and AO (AND-OR) based functions | Less efficient OA and AO based functions |
| Area | Less area consuming | More area consuming |
| Leakage | Lower leakage | Higher leakage |

Attribute (i) in Table II is based on the fact that Type-A efficient gates utilize parallel paths in PDN (NOR like), while Type-B efficient gates utilize parallel paths in PUN (NAND like). These qualities cause the Boolean expressions of A-B DML bicells to be dominated by OR-like representation. See the next example:

$$NAND_B(NOR_A(a,b),NOR_A(c,d)) = \overline{\overline{a+b} \cdot \overline{c+d}} = a+b+c+d$$

Figure 11A:
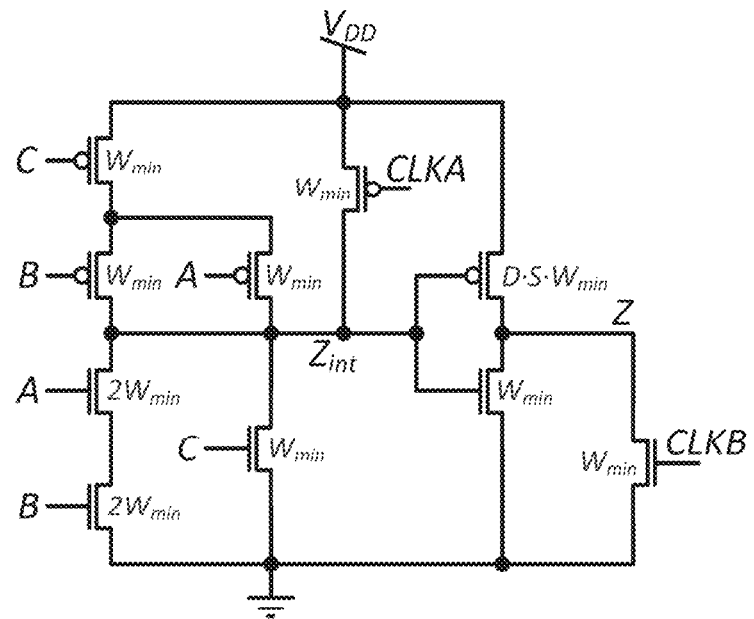
FIGS. 11A and 11B are simplified circuit diagrams of logic circuit implementation by A-B and B-A bicells respectively, according to embodiments of the present invention.
Figure 11B:
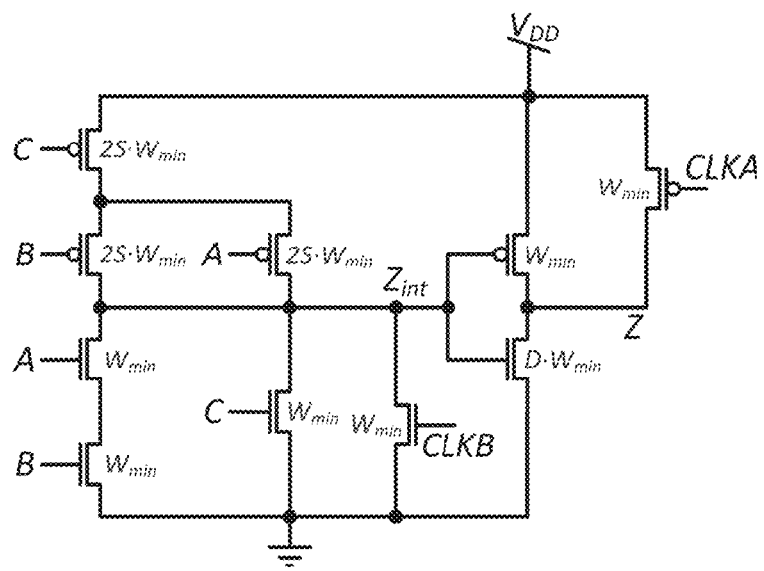

Reference is now made to FIGS. 11A and 11B which are simplified circuit diagrams of logic circuit implementation by A-B and B-A bicells respectively, according to embodiments of the present invention. Attribute (ii) in Table II is illustrated by a typical example and could be generalized to all OA and AO based gates (see FIG. 11A for the A-B AO bicell and FIG. 11B for the B-A AO bicell).

In FIGS. 11A-11B, $W_{min}$ is the minimal technology dependent transistor width, S represents the sizing ratio between nMOS and pMOS transistors and D is a driving strength factor of the cell. These parameters may be considered analogous to traditional logical effort (LE) parameters that are commonly used in CMOS logic. In practice, these parameters are fundamentally different than the standard LE terms (derived for CMOS) due to the different structure of the DML gates and the fact that the optimization is made for the dynamic transitions only. Analysis has shown that in terms of LE parameters, the A-B configuration is preferable.

Two additional factors in favor of the A-B bicell configuration are its reduced leakage currents (especially $I_{SC}$) and smaller area consuming layout. All the bicells in the exemplary DML basis library utilize an assembly of one, two or three input stage gates and only one output stage gate. It is therefore desirable that the input staged gates be power and area efficient. Since the Type-A DML gates have a more compact layout, the evaluation is done through more conductive nMOS transistors. The sub-threshold conduction leakage is directly proportional to the transistors width, so the reduced PDN evaluation paths are more efficient. Furthermore, the lower mobility and minimal sizing of pMOS PUN and pre-charge transistors also contribute to lower sub-threshold leakage and $I_{SC}$, as the power source is separated by a more resistive path.

Timing Characterization

In the present example, the DML synthesis is timing oriented and is as precise as possible in order to ensure correct post-synthesis functionality. The iterative synthesis process utilizes multiple library views, each having different timing characterization.

The characterization of pseudo-static and static views is relatively simple, as it does not involve any real dynamic parameters and it will not be elaborated.

The characterization of the dynamic library cells is more complicated, as it includes some sensitive timing parameters that should prevent glitches (false evaluation) and time constraints violations. Another important disparity is that these timing parameter definitions are different for footed and un-footed versions. Therefore the dynamic library includes both footed and un-footed parameter values. For footed bicells these dynamic parameters are very similar to $t_{setup}$ and $t_{hold}$ of edge triggered registers, because they are tightly associated with the CLK signal transitions. For un-footed bicells the timing parameters are slightly different, as these are associated with the logic inputs transitions.

A standalone footed inverter embodies an inherent dynamic failure mechanism, thus a supplementary $t_{setup}$ parameter was introduced to get over this malfunctioning.

Figure 12:
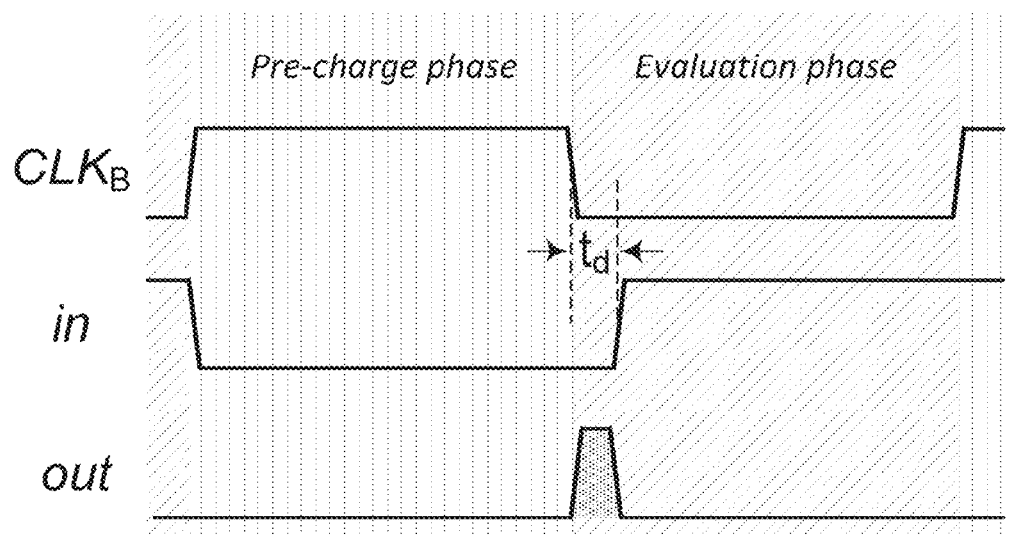
FIG. 12 is a simplified diagram of false evaluation by a standalone headed Type_B inverter.

With no setup time the inverter would evaluate incorrectly, as its input arrives with a delay relatively to a CLK signal (as illustrated in FIG. 12). The $t_{setup}$ parameter is measured for all bicells; however its reference signal is altered depending on the footed/unfooted structure. For any footed cell the $t_{setup}$ parameter is measured relatively to the CLK signal, so in the case of late arrival of the input signal its value is high. Note that a high $t_{setup}$ value is interpreted as a slowdown of the logic datapath, thus the appearance of footed cells deep inside the logic path is undesirable.

The implemented inverter is footed, so its use should be minimized. In order to minimize the inverter's appearance, the inverter's .lib delays are assigned a relatively high delay cost-parameter (false parameter), which limits its use by the synthesizer. The $t_{hold}$ parameter is defined in order to ensure correct signal capture by a pipeline stage register. Since the clocked cell is also a synchronous device, it is characterized in the same fashion for all library cells.

Additional Netlist Scriptural Manipulations

Additional scriptural manipulations are now performed. One of these additional manipulations is to remove the stub inverters from the synthesis generated netlist.

Figure 13A:
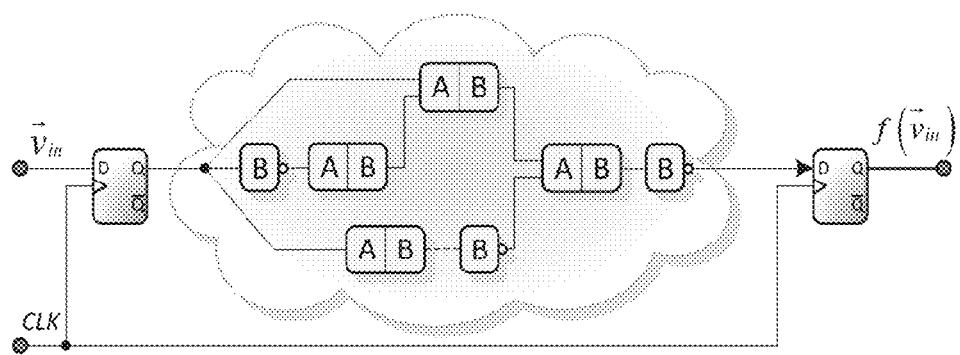
FIGS. 13A and 13B are simplified circuit diagrams of a DML logic circuit before and after stub inverter removal respectively, according to embodiments of the present invention.
Figure 13B:
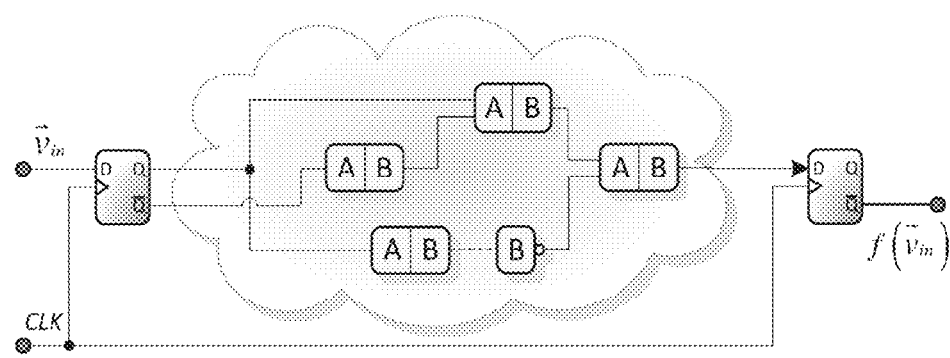

Reference is now made to FIGS. 13A and 13B which are simplified circuit diagrams of a DML logic circuit before and after stub inverter removal respectively, according to embodiments of the present invention. Stub inverters might be shifted backward or forward and incorporated as part of the logic block registers, which shall have complementary outputs $\overline{Q}$. This scriptural iteration should precede the footering script procedure, which swaps all the primary gates to their footed counterparts.

Otherwise, an already footed inverter will be removed, while the following bicell is left unfooted and exposed to a static drive failure.

Some synthesizers may take care of stub inverters removal as a built in part of the synthesis procedure. If this feature is not included, a script is a possible solution for efficient and elegant treatment of redundant inverter cells. However, such a script is not trivial and requires some preparation and study in order to comply with all RTL-netlist hierarchical design styles. An interim solution is to assign a relatively high cost for the inverters delay parameter (false parameter), such that the synthesizer will try to minimize its use.

The next script iteration is an inverter footering procedure, which performs two tasks: renaming the inverter cell's name to a footed version and "stitching" a $CLK_A$ net to a newly inserted dedicated $CLK_A$ input.

Figure 14:
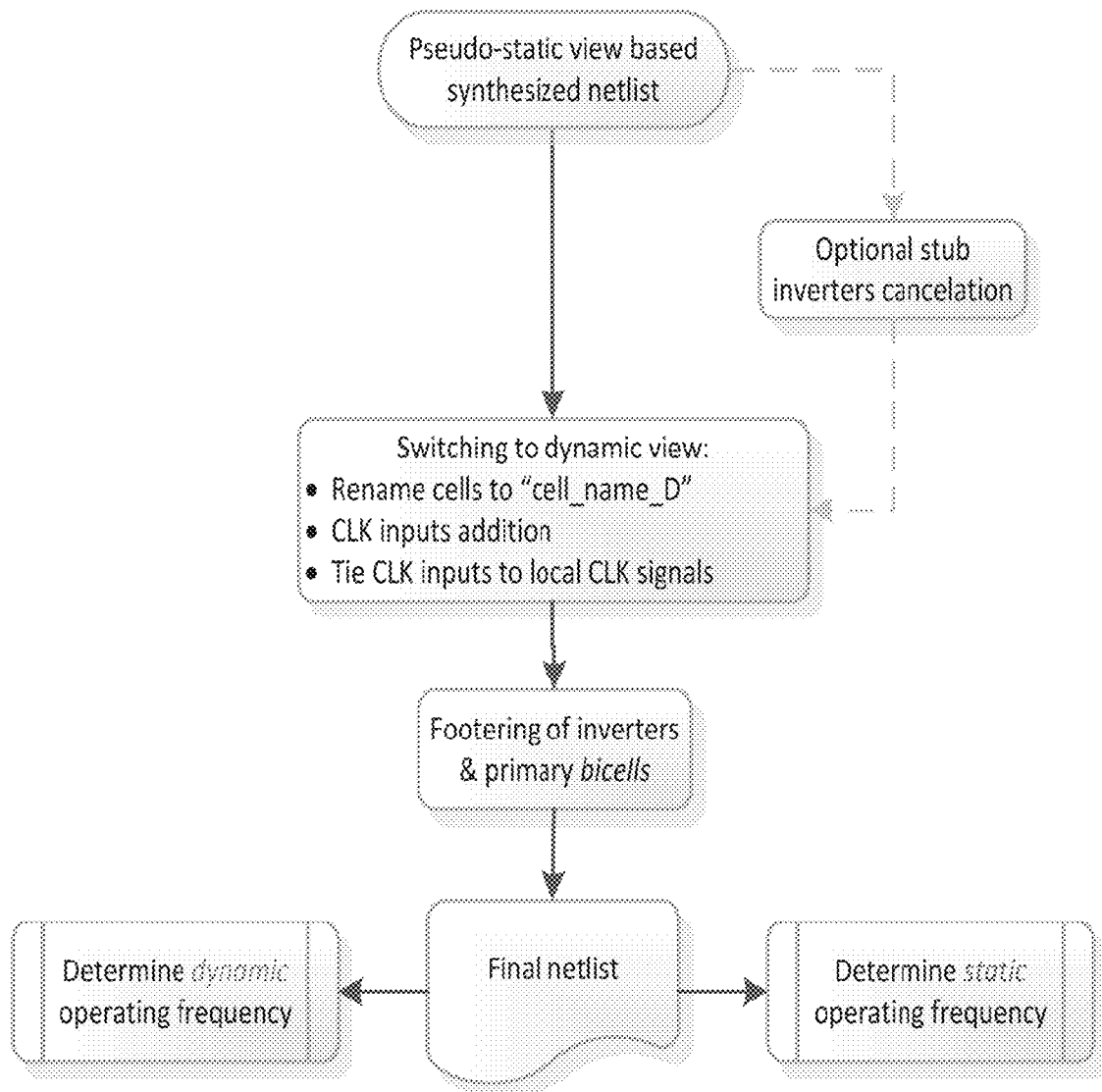
FIG. 14 is a simplified flowchart of netlist scriptural manipulations, according to embodiments of the present invention.

FIG. 14 is a simplified flowchart which illustrates the netlist scriptural manipulations, according to embodiments of the present invention.

Pipelining

The basic synchronous design described above consists of only one pipeline stage. In practice a full design process may incorporate multiple stages. Many pipelining strategies and clocking scheme techniques are available for higher throughput, including masking the pre-charge phase, which has no computational demand, with multiphase overlapping clocks and the use of a phase separation by $C^2MOS$ registers or regular D-F.F registers (followed by footed cells), which increase the parallelism of the computation. These improved methods have their own pros and cons. However, there is no closed form solution and the most DML fitting approach should be assigned for a given design.

Library Logic Set for Characterization

The simplistic principle of a standard library use is that increasing the number of divergent cells with various driving strengths results in a more optimal design. High quality standard cell libraries contain up to thousands of cells. However characterization of a cell library is a tedious and time consuming process. Therefore a compromise should be found. Academic research has also suggested that increasing the number of basic standard cells in a library beyond several dozen generally does not improve the speed of the design dramatically. In addition, synthesizing various designs shows that the use of libraries with fan-in higher than 2-3 achieves only a minor gain in terms of design metrics, while introducing a significant complexity leap. Based on this data, the exemplary DML library presented here contains several dozen of cells.

In order to design both a compact and efficient standard cell library, some preliminary preparation work was carried out in order to evaluate different design options for each cell. This evaluation included theoretical analysis of various topologies and simulations to substantiate the adopted conclusions. One of these conclusions was to use the NORA-like dynamic topology (bicells), which highlighted the advantages of both possible structures of DML gates (A and B types). A dedicated logical effort analysis was performed in order to outline the most efficient DML gates of both types.

Furthermore, this analysis provided a deeper insight of progressive DML sizing for better performance and for local optimization. Finally, the most efficient DML elementary gates of both types were used as building-blocks of the dual stage A-B bicells.

The use of DML bicells lowers the minimum logic functionality achieved in comparison to standalone cells. It creates a need for a very big library in order to gain the same logic versatility of a standard library. For example, two elementary cells with two inputs each, has eight different topological combinations, meaning that up to eight different bicells should be constructed. This number of cells grows in up to $n^n$ rate, as a function of fan-in and number of elementary gates. Several drive strengths for each combination, makes the number of cells even larger. Most of these gates are logically redundant, and moreover many of them are comparable to CMOS gates in terms of speed.

FIGS. 15A-15B present an exemplary DML bicell library, according to embodiments of the present invention. In order to stay in line with the chosen A-B cascading policy, only the most efficient DML bicells are realized. These bicells have several driving strengths, 1×, 2×, 3×. In order to keep a reasonable amount of cells only the most prevalent cells have a larger number of drive strengths, as other entities have more limited strength diversity. The exemplary library consists of a reasonable number of cells and these cells provide a sufficient design capability in terms of performance and logic flexibility.

VI. Energy Efficient Carry Skip Adder

The effects of critical path timing on DML circuit design and operation was presented above.

A Carry Skip Adder (CSA, also called carry bypass adder), was chosen as a benchmark to demonstrate and evaluate the use of DML along critical paths (CPs) in logic circuits. The CP of the CSA increases as a function of the number of inputs, making it possible to examine the E-D trends as a function of the CPs lengths. It is important to note that the proposed methods can apply over any combinatorial circuits and CSA was chosen only due to its modularity and simplicity.

Three designs are considered:
I) A CPs accelerator which has two operation modes:
  a. "DML Carry Path-Dynamic"—The DML CPs are activated in the dynamic mode.
  b. "DML Carry Path-Static"—The DML CPs are activated in the static mode.
Note that in both of these modes the rest of the non-CPs portions of the system are constructed with standard CMOS.
II) A CPs accelerator with low energy consuming non-CPs, as described in Sub-Section
III(B), which has two operation modes:
  a. "DML Carry Path-Dynamic. With low energy non-CPs-Static"—The DML CPs are activated in the dynamic mode, while the rest of the system operates in the DML static mode.
  b. "DML Carry Path-Static. With low energy non-CPs-Static"—The DML CPs are activated in the DML static mode, similar to the rest of the system.
III) CMOS equivalent design.

VI.A. CMOS CSA Design

A conventional CSA is composed of a set of Ripple Carry Adder (RCA) blocks. These blocks essentially utilize the carry propagation in order to skip the carry from one RCA to the next RCA block. It is possible to predict the propagation of the carry by a simple XOR gate. The prediction mechanism may substantially reduce the delay. The CP in CSA occurs when the carry ripples at the first block, and then skips the rest of the blocks and then ripples again at the last block. This is the longest possible route in the CSA.

Figure 16:
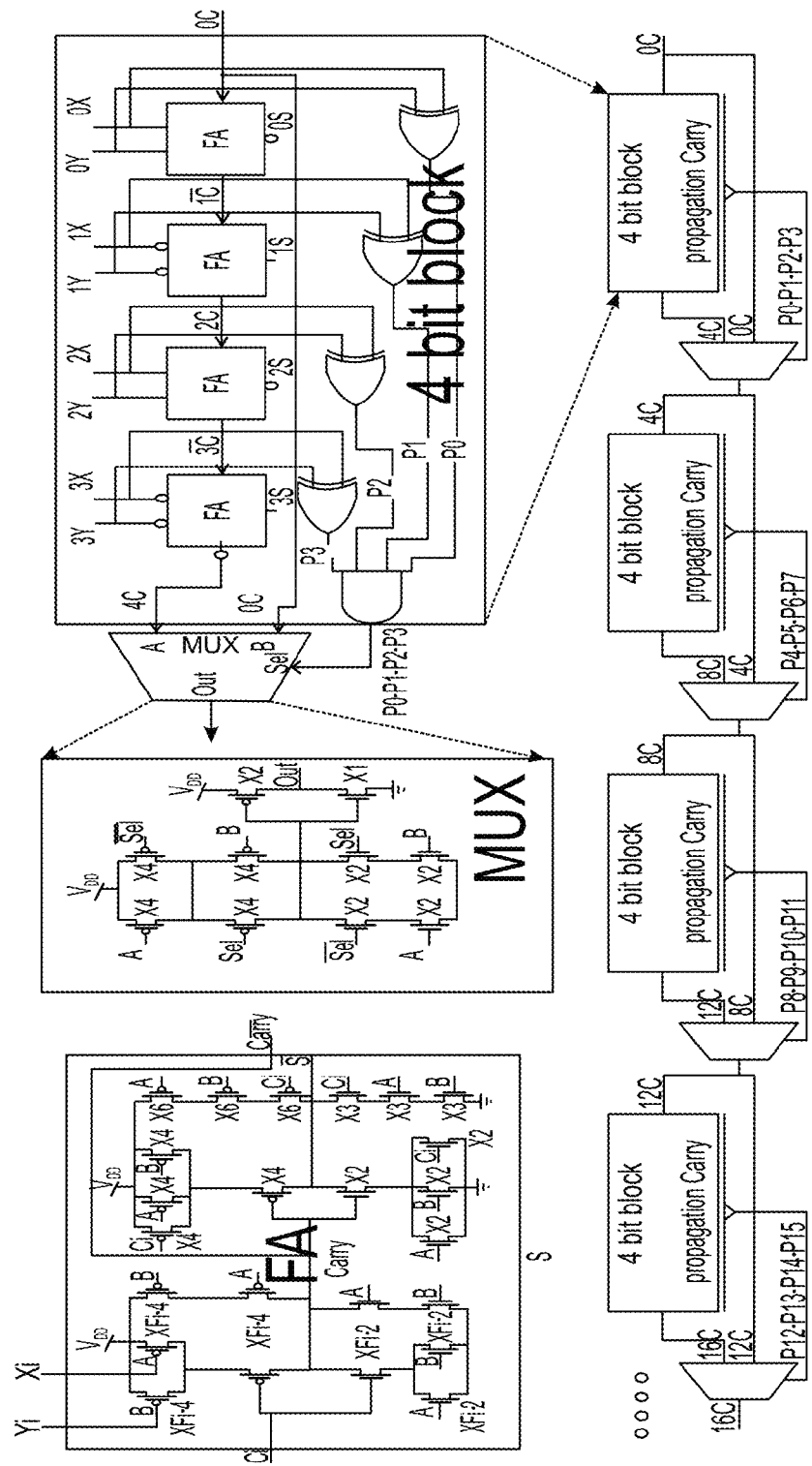
FIG. 16 is a simplified circuit diagram of a Carry Skip Adder (CSA) logic circuit.

Reference is now made to FIG. 16 which is a simplified circuit diagram of a Carry Skip Adder (CSA) logic circuit. The CMOS CSA design of FIG. 16 was implemented with a fixed size of 4-bits blocks. The methods presented herein may be generalized to any CSA block size constant or variable and for multi or single level carry path. A general single-bit Full Adder (FA) equation is:

$$S = A \text{ XOR } B \text{ XOR } C_{in} \quad (1)$$

$$C_{out} = AB + C_{in} \cdot (A+B) \quad (2)$$

$$P = A \text{ XOR } B \quad (3)$$

Figure 17:
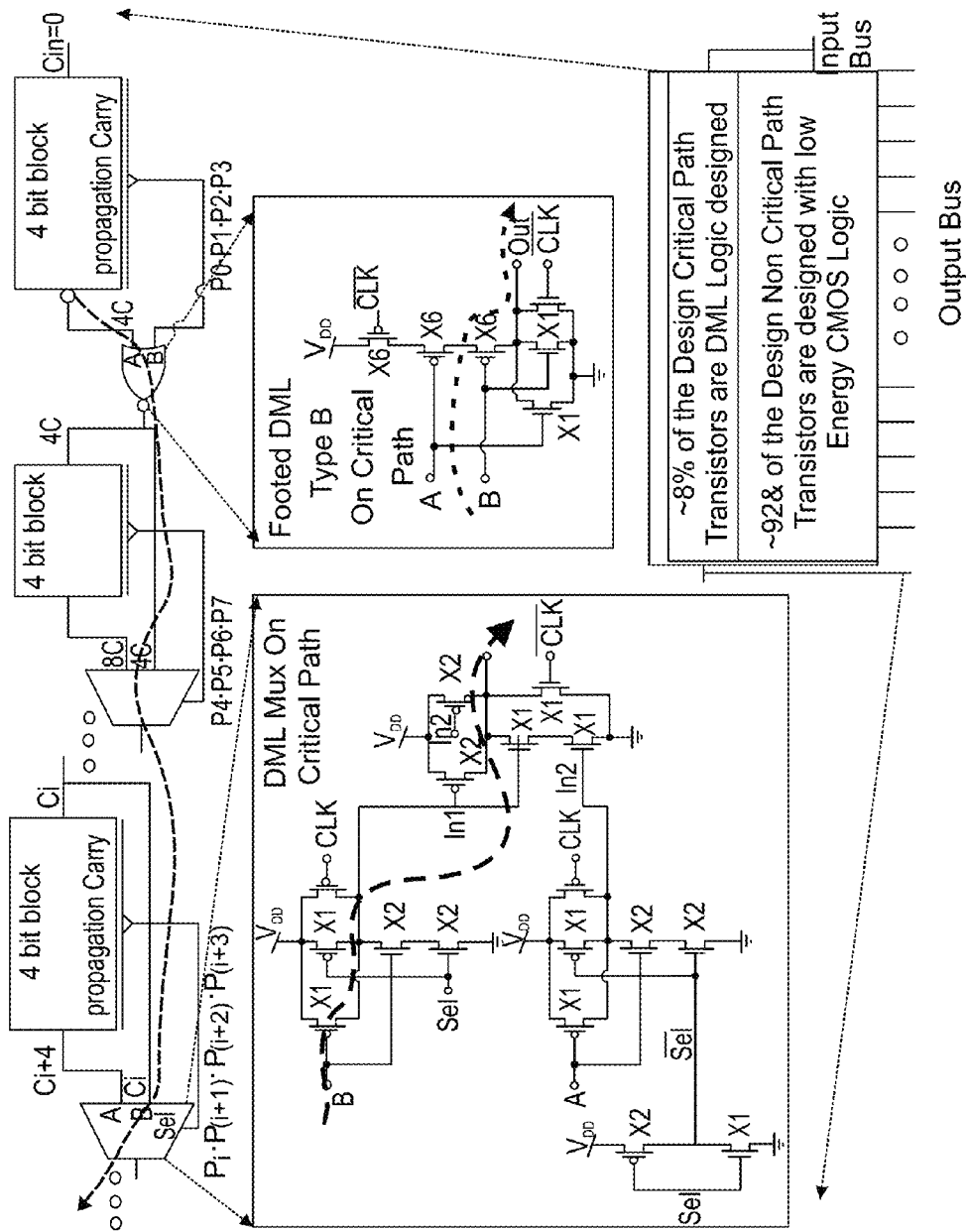
FIG. 17 is a simplified circuit diagram of a DML Critical Path design for a CSA, according to embodiments of the present invention.

Reference is now made to FIG. 17 which is a simplified circuit diagram of a DML Critical Path design for a CSA, according to embodiments of the present invention. For an RCA, $C_{out}$ is an input to the next FA. For the CP, the carry would propagate through all FAs. Due to the fact that $C_{out}$ is on the CP for each RCA, the mirror circuit for computing $C_{out}$ is used, as shown in FIG. 17. This circuit calculates the inverted value $C_{out}$ and when serially chained, it reduces the circuitry on the CP (i.e. eliminates one inverter for each FA). Furthermore, the use of the mirror adders creates the need for inverting inputs for all odd FAs and inverting outputs for all even FAs, as shown in FIG. 16. All the logical gates presented in FIG. 17 are constructed with standard CMOS. A standard sizing optimization, for the RCA of minor FAs using Logical Effort (LE), yields the sizing factor Fi (as shown in FIG. 15 for all the carry path gates). For all is which are a multiple of 4, $F_i=1$ and for all the rest $F_i=3.5$. All transistors specified sizes are in the form Xsize (e.g. ×4Fi means 4 times Fi times $W_{min}$) where, their size is normalized to the transistor minimum width $W_{min}$.

VI.B. DML Critical Path Design

FIG. 17 shows the DML implementation of the CSA's CP. The CP flows through the first NOR (assuming that the carry in of the whole design is 0) and through all the MUXs of the design. The gate level implementation of the CP can be constructed with various topologies of DML: DML NOR gates are most efficiently implemented in the "Type A" topologies and NAND gates in "Type B".

The Boolean logic does not allow an efficient implementation of a MUX with a NOR following a NAND or vice-versa, which is the preferred topology for DML logic design. Therefore, in the chosen topology, the CP is composed only of NANDs (where one of them is implemented using efficient "Type B" and the other one has a less optimal "Type A" structure). The last inverter in each RCA block is a footed "Type B" inverter, which maintains correct Pre-Charge phase for the CP. The sizes of the transistors in terms of minimal transistor width are shown in FIG. 17. In the design, implemented in such way, only 8% of transistors will (optionally) operate dynamically, while the remaining 92% of the transistors are kept at the low energy static mode. This modular design keeps the same complexity and the same dynamic-to-static-gates-ratio, as a function of the input vector's length, N [bits].

VI.C. Simulation Results

The modular benchmarks circuits, described in the previous section were simulated in a standard 40 nm TSMC CMOS process, using the Spectre Cadence simulator. Implementations of these methods on the benchmark CSAs were examined mainly over the E-D plain and as a function of the operating voltage and the CP's length.

All energy and delay measurements are per-operation.
The E-D Plain as $f(V_{DD})$ Each design was carefully analyzed as a function of the supply voltage. Currently even standard manufacturers realize the potential held in the near\ sub-threshold operation. Standard cell libraries, designed for 700-800 mV, are available. For special low power applications, the libraries are normally designed for 200-500 mV. In order to examine the proposed concept both for low voltage and strong inversion operations, measurements are performed with supply voltages varying from 0.4V to 1.1V.

Figure 18A:
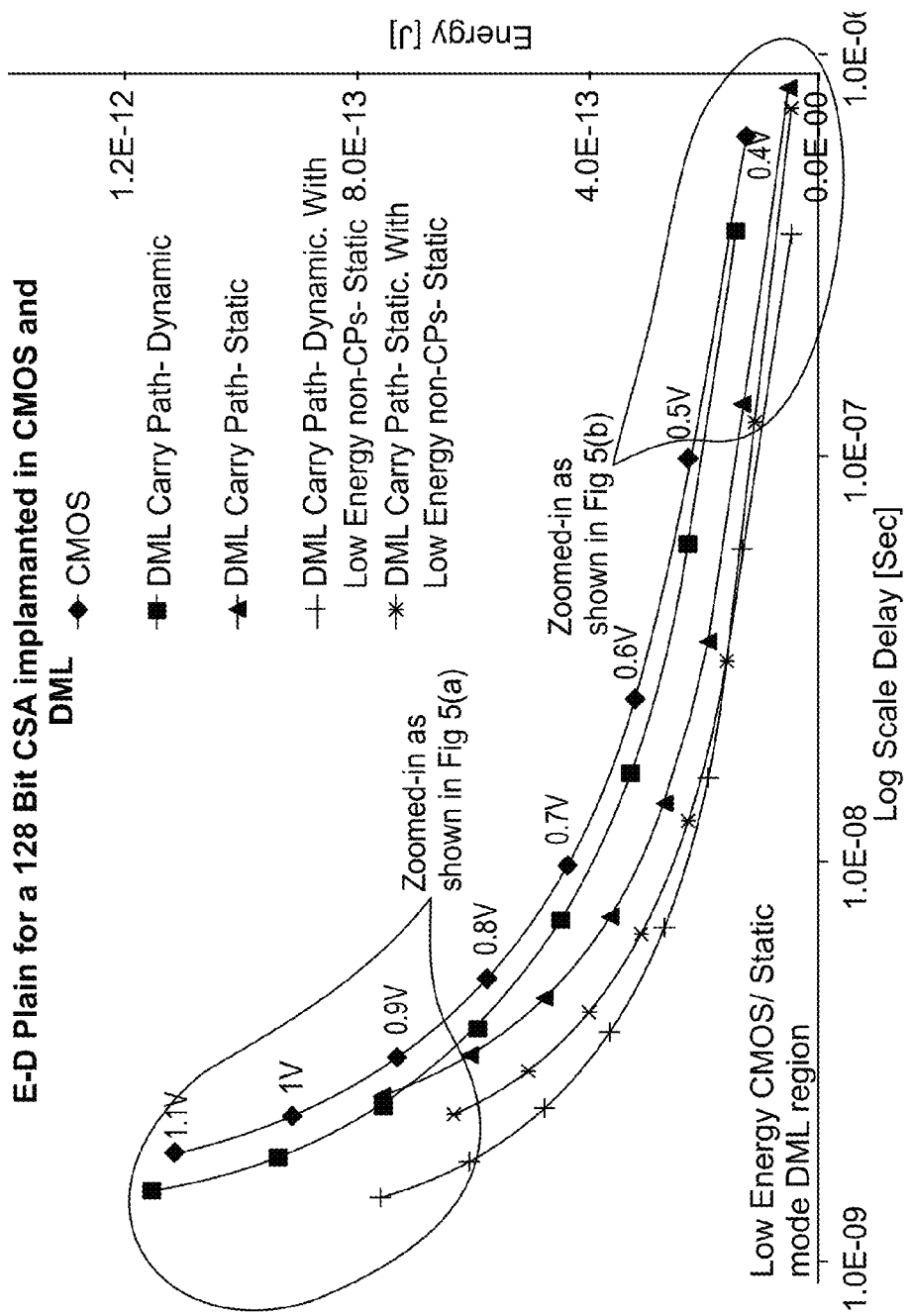
FIGS. 18A-18C show E-D levels for 128-bit CSA designs, according to embodiments of the present invention.
Figure 18B:
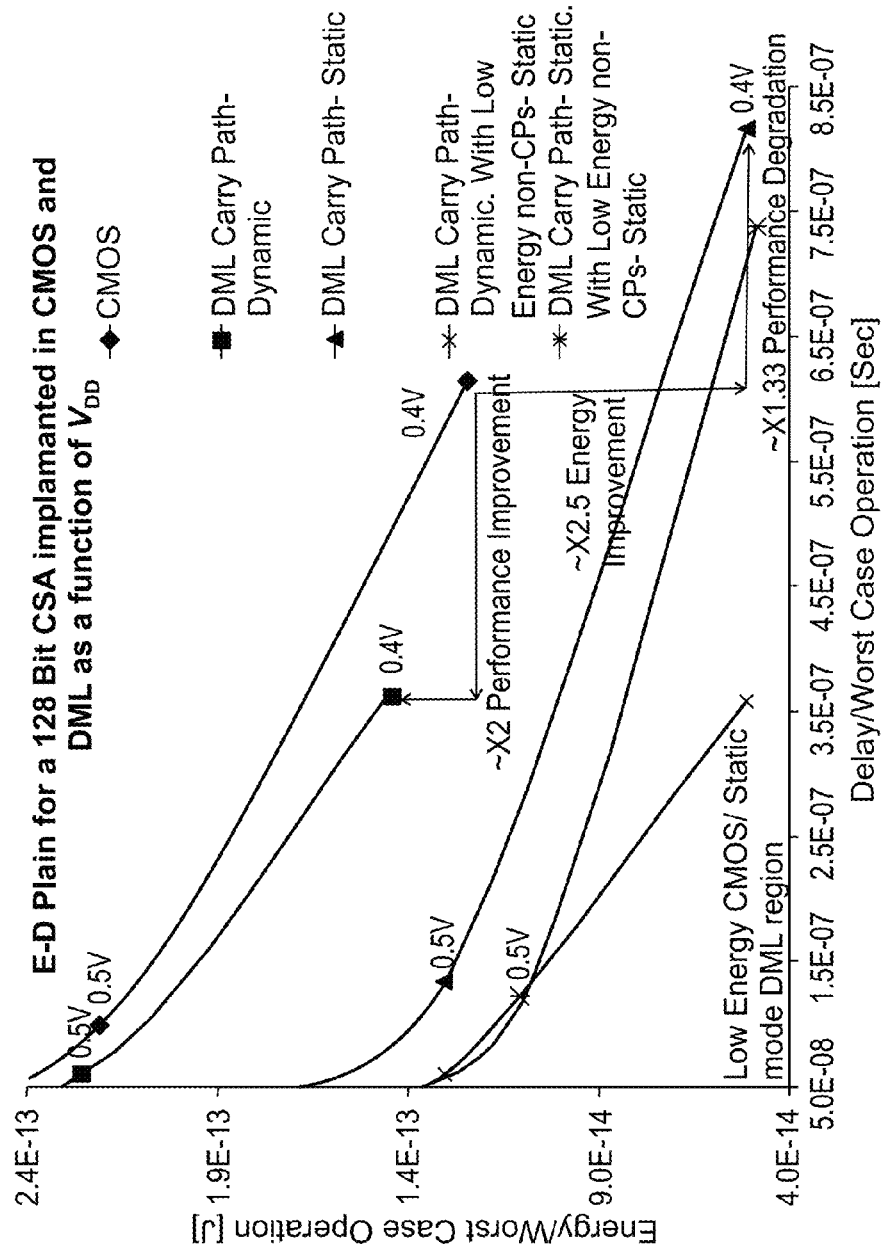
Figure 18C:
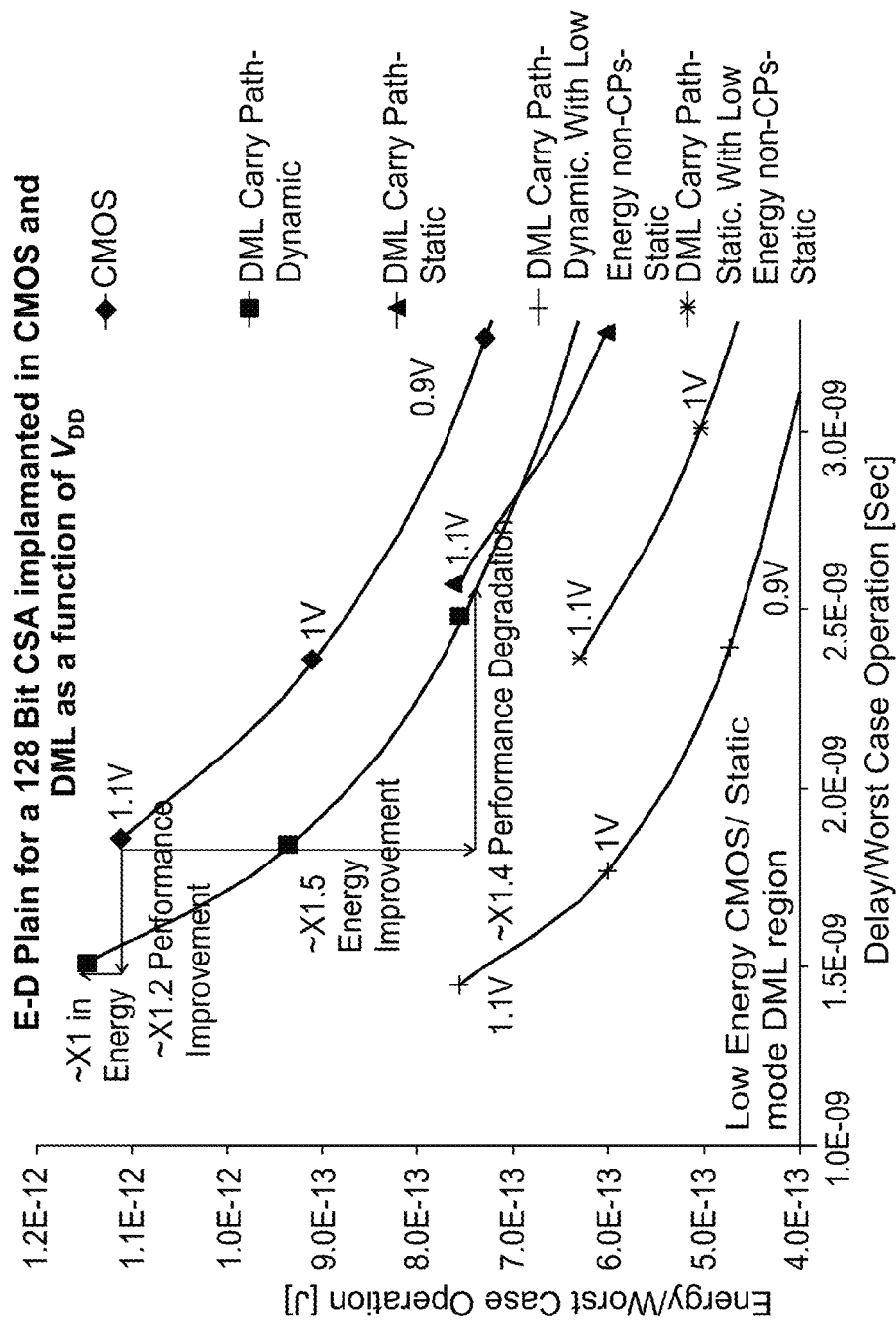

Reference is now made to FIGS. 18A-18C which show E-D levels for 128-bit CSA designs, according to embodiments of the present invention. The E-D curves for all designs of a 128 bit CSA are plotted in FIG. 18A. The curves' order from top to bottom is: CMOS, CMOS design with a CP in Dynamic DML mode, CMOS design with a CP in static DML mode, low energy non-CP design with a CP in Dynamic DML mode, and Low energy non-CP design with a CP in static DML mode. The last two curves are presented in the gray enhanced region, at the bottom of the graph. This region represents the low energy area of the E-D plain, achieved by implementing all non-CPs with the low energy DML static mode (which, as described in Section II, could be also referred as "energy optimized CMOS"). The two areas of interest are circled at the edges of FIG. 18A and are enlarged in FIGS. 18B and 18C. FIG. 18B shows the tradeoff area for a 400 mV operating voltage for all designs. FIG. 18C presents that same tradeoff for 1.1V. These two extremities clearly show that these designs are highly flexible in energy consumption and performance, for the whole range of voltages.

The conclusion from analyzing the DML enhanced CP plots (second and third curves) compared to the CMOS plot (first curve) for the 0.4V supply (FIG. 18B) is that the DML enhanced CP achieves ×2 in performance. This achievement, however, comes at the expense of a 16% increase in energy consumption. If the system is such that two operational frequencies are allowed, when a low-power operation is required, the static mode (with a low frequency) could be applied yielding ×2.5 energy improvement at the expense of performance degradation of ×1.3.

The ability to change operating conditions on the E-D plain on-the-fly is a feature that may be easily utilized to improve the system flexibility and E-D efficiency.

For the 1.1 V supply (FIG. 18C), it is shown that boosting the performance of the CP by 20% increases energy consumption by only 3%. Again, if the system is such that two operational frequencies are allowed, when a low-power operation is required, the static mode could be applied yielding ×1.5 energy improvement at the expense of performance degradation of ×1.4. These results reveal that a low-voltage operation magnifies the differences between the different modes. There are a few reasons for this trend. First, the performance advantage of DML circuits in the dynamic mode over standard CMOS intensifies with the supply voltage lowering. The second, less dominant factor, is the reduced sensitivity of DML circuits to increased leakage currents at low supply voltages.

By examining the DML performance optimized CP with low energy non-CP plots (two lowermost curves), it is clear that the total energy is reduced by ×2-×3 (gray region) for all voltage regions—which is substantial. In addition, the improvement in CP performance of ×1.3 and ×2.1 are achieved for the 1.1V and 400 mV supplies, accordingly. The results for the CP are quite similar to the results achieved for operating without the low energy non-CP gates. This is due to the fact that the CPs themselves have not changed. To conclude, the flexibility of the DML design led to a significant improvement in both energy and performance.

The E-D Plain as f(N)

Figure 19A:
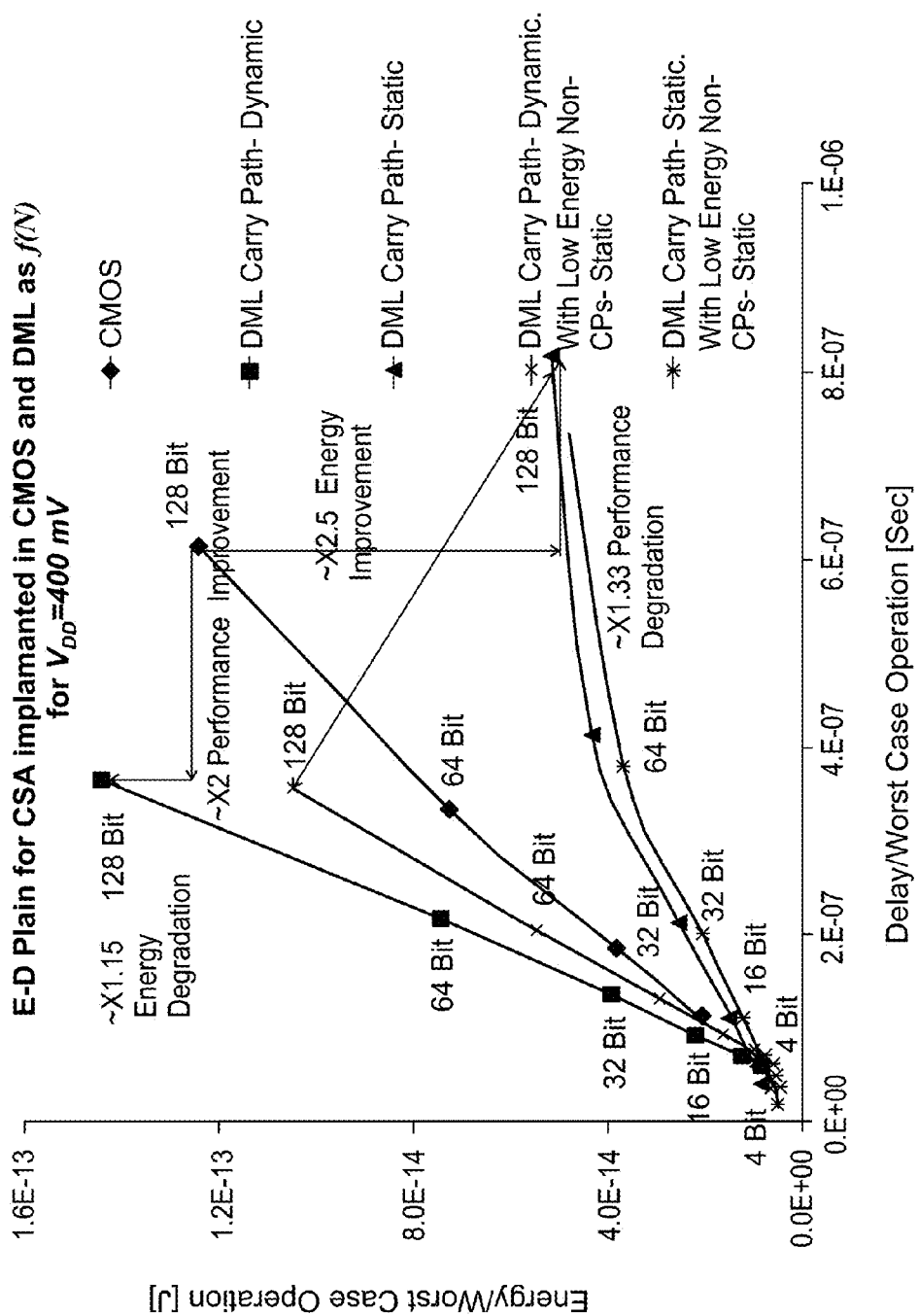
FIGS. 19A and 19B show E-D levels as a function of the CSA size, according to embodiments of the present invention.
Figure 19B:
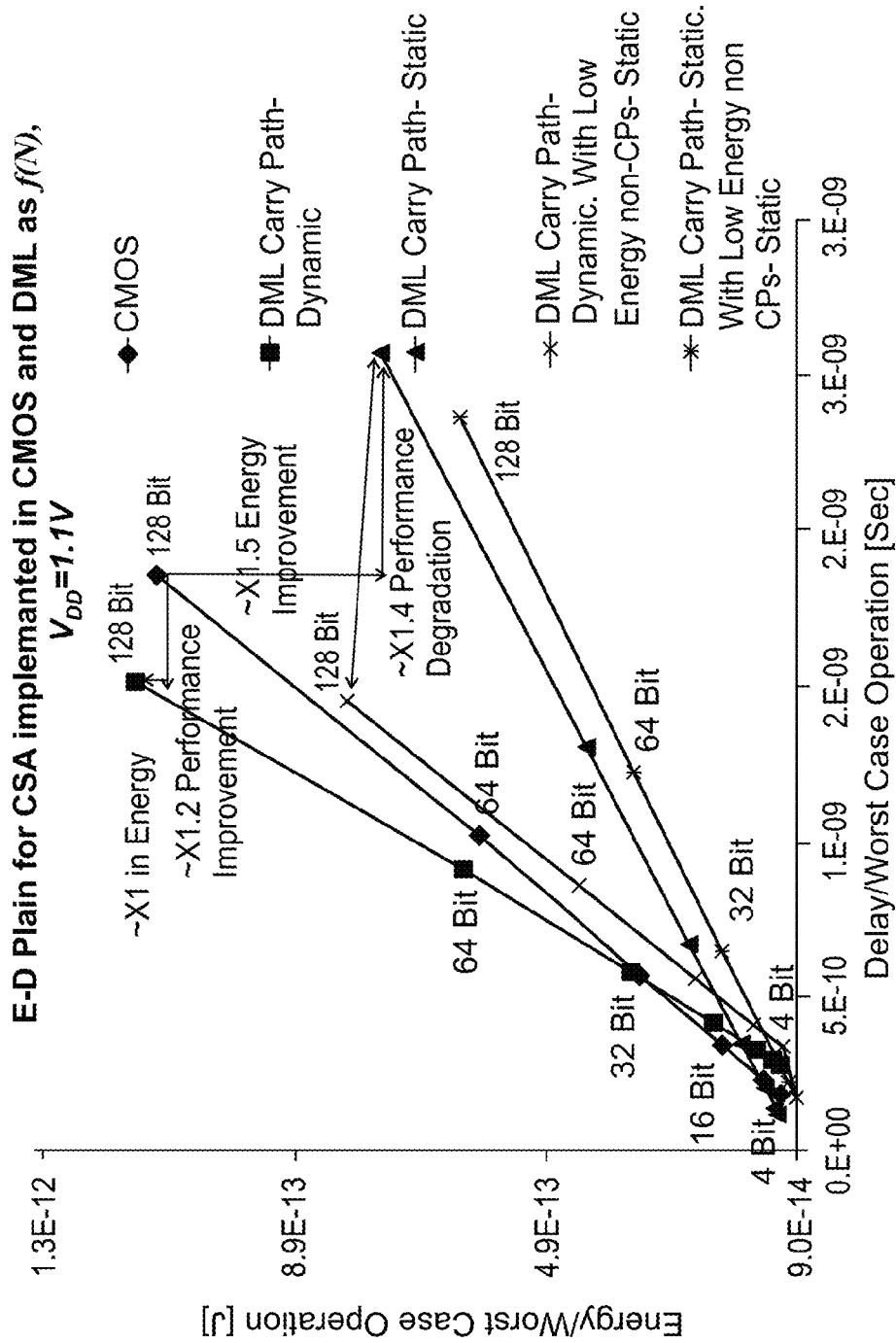

Reference is now made to FIGS. 19A and 19B which illustrate E-D levels as a function of the CSA size, according to embodiments of the present invention. The efficiency of the proposed concept as a function of the CP's length, which is closely related to the size of the design, is now examined. The CSA's size/length depends on the number of inputs, N.

FIGS. 19A and 19B show the E/D trends for all designs as a function of N. Each plot starts with the minimal CP related to N=4 and goes up to the longest examined CP of N=128. The point where N=128 appears both in FIG. 19A and FIG. 19B. The key point of this analysis is to show the scalability of the method for various design sizes and not only for a very long CP.

FIG. 19A and FIG. 19B show that as N increases (or $\log_2$(N) increases), the scalability of the energy and performance improvement is almost constant both for 400 mV and 1.1V. There is another interesting point regarding the 128 bit design with $V_{DD}$=1.1V, presented in FIG. 19B. The Low Energy design (DML static mode for non-CPs) with CPs operated in the dynamic mode consumes slightly more energy than the standard CMOS non-CP design with DML dynamic CP, but achieves more than ×2 improvement in performance.

As can be seen from FIG. 19A, all designs (N=4 . . . 128) with performance improved CP show a significant improvement in performance at 400 mV, as compared to the CMOS counterparts. However, for the 1.1V supply (FIG. 19B), this efficiency can be observed only from N=32. This behavior naturally depends on the specific gates topology of the chain. The CSA specific design represents an average case where some of the DML gates on the CP are very fast in comparison to CMOS, such as "Type B" NAND, and others hold very small improvements, such as "Type A" NAND. For this reason, it is expected that for other benchmarks the improvement in E/D will occur for an $N > N_{MIN}$.

Stimuli Input Vector Complexity

The data presented above simulated input stimulus that activated the CP of each circuit. These stimuli trigger the worst delays which are possible for these designs. Each circuit requires different inputs to activate its CP. The worst case of energy consumption depends on the input vector. Worst case is reached when the input vector switches as many gates as possible for each RCA chain (static portions of the design). In the previous two subsections, for the case of 128 bit CSA, input vectors were chosen to switch 40 outputs regardless the CP switching. This approach is quite pessimistic, since the average number of switching outputs is lower than 40.

Assume equal probabilities for logic "1" and logic "0" for each input. The probability for a carry in a FA is q=0.5. The probability for a carry to propagate through K successive bits is:

$$q_k = \underbrace{\frac{1}{2} \cdot \frac{1}{2} \cdot \frac{1}{2} \cdots \frac{1}{2}}_{K} = \frac{1}{2^k}$$

Alternatively, the probability of a carry being either killed or generated through K successive bits is $1-q_k$. Therefore, the probability for propagating more than 4 bits is 6.25%, which is quite low. For example, considering the 128 bit design composed of 4 bit RCAs (i.e. 32 segments): rippling of 2 bits inside each 4 bit RCA (in addition to the switching of the whole CP) is, in terms of probability, a quite reasonable or even a harsh case. Nevertheless, input vectors which are more energy consuming (for the static parts of the design) were simulated (60 and 80 switched outputs). The results showed that as the input stimulus complexity rises the additional energy required for the dynamic operated CP becomes more and more negligible in comparison to the total energy of the designs. These results are, of course, reassuring for all worst\typical\best case input vectors, energy-wise.

In conclusion, the proposed approaches were analyzed on a 128 bit Carry Skip Adder (CSA) benchmark. Simulations, carried out in a standard 40 nm TSMC CMOS process with $V_{DD}$=400 mV, show that the proposed approaches allow performance improvement of ×2 along with reduction of energy consumption of ×2.5, as compared to a standard CMOS implementation. At $V_{DD}$=1.1V, improvements of 1.3× and 1.5× in performance and energy were achieved, respectively.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for designing a dual-mode logic circuit, wherein said logic circuit is selectably operational in static and dynamic modes, said method comprising:
    providing a basis library comprising a DML logic gate inverter and a plurality of dual-mode logic (DML) bicells, each of said DML bicells comprising:
        i) a type-A DML logic gate including a clock input and being independently selectable for static or dynamic mode; and
        ii) a type-B DML logic gate including an inverted clock input and being independently selectable for static or dynamic mode;
    forming a pseudo-static library from said basis library by:
        i) modifying each bicell of said basis library by removing respective clock and inverted clock inputs into said bicells; and
        ii) specifying respective values of at least one dynamic timing parameter for said DML inverter and for each of said modified pseudo-static library bicells;
    forming a dynamic library from said basis library by specifying respective values of a plurality of dynamic timing parameters for said DML inverter and for each bicell of said basis library;
    defining a logic behavior of a required logic circuit;
    obtaining an initial logic circuit design by synthesis of said pseudo-static library and said defined logic behavior; and
    forming a dynamic circuit design by replacing modified pseudo-static library bicells in said initial logic circuit design with corresponding bicells from said dynamic library,
    wherein the synthesis of said pseudo-static library and said defined logic behavior is implemented by an electronic design automation system.

2. The method according claim 1, wherein said basis library includes respective dynamic timing parameter data for said DML inverter and for each of said bicells.

3. The method according claim 1, wherein specifying a respective dynamic timing parameter value comprises retrieving dynamic timing data from said basis library.

4. The method according claim 1, wherein said at least one respective dynamic timing parameter of said pseudo-static library comprises an evaluation period.

5. The method according claim 4, wherein said at least one dynamic timing parameter of said pseudo-static library bicells further comprises an evaluation power.

6. The method according claim 1, wherein said dynamic timing parameters of said dynamic library bicells comprise setup time and hold time.

7. The method according claim 1, wherein said DML logic gate inverter comprises a headed Type-B inverter.

8. The method according claim 1, wherein a DML logic gate comprises:
    a static gate comprising at least one logic input and a logic output; and
    a switching element associated with said static gate, comprising a first input connected to a constant voltage, a second input for inputting a mode selection signal, and an output connected to a logic output of said static gate, said switching element being configured to:
    i) disconnect said static gate output from both of said first and second inputs when said mode selection signal applies a constant voltage to said second output, thereby to select static mode operation; and
    ii) connect said static gate output to both of said first and second inputs when said mode selector signal applies a dynamic clock signal to said second input, thereby to select dynamic mode operation.

9. The method according claim 8, wherein for a type-A DML logic gate said static logic gate comprises a type-A gate and wherein for a type-B DML logic gate said static logic gate comprises a type-B gate.

10. The method according claim 1, wherein said bicells in said initial logic circuit design are cascaded so as to alternate type-A DML logic gates with type-B DML logic gates.

11. The method according claim 1, wherein for each of said bicells said Type-A and Type-B DML logic gates are cascaded to form an A-B pair.

12. The method according claim 11, wherein said forming a dynamic circuit design further comprises adding a footer to each type-A input of a bicell logic gate which follows a register in said initial logic circuit design.

13. The method according claim 1, wherein said initial logic circuit design is provided as a text file, and said replacing modified bicells in said initial logic circuit design comprises editing said text file to include said respective bicell clock inputs.

14. The method according claim 1, wherein said logic behavior is provided in a high-definition language (HDL) format.

15. The method according claim 1, wherein said synthesis is performed with an Electronic Design Automation (EDA) tool.

16. The method according claim 1, wherein said basis library includes respective static timing parameter data for said DML inverter and for each of said bicells, and further comprising:
    forming a static library from said basis library by:
        i) modifying each bicell of said basis library by removing respective clock and inverted clock inputs into said bicells; and ii) specifying respective values of at least one static timing parameter for said DML inverter and for each of said modified static library bicells; and determining a static operating frequency from said dynamic logic circuit design and said static library.

17. The method according claim 1, further comprising completing said logic circuit design from said dynamic circuit design and said dynamic library, wherein said completing said logic circuit design comprises at least one of: circuit placing and routing.

18. The method according claim 1, further comprising:

analyzing said initial logic circuit design to identify critical paths, wherein said forming a dynamic circuit design comprises retaining at least some pseudo-static bicells outside said critical paths in static configuration.

19. The method according claim 18, wherein all modified pseudo-static library bicells along said critical path are replaced with corresponding bicells from said dynamic library.

20. The method according to claim 18, wherein said critical path is constructed from DML cells.

\* \* \* \* \*